US008582641B2

(12) United States Patent
Beales et al.

(10) Patent No.: US 8,582,641 B2
(45) Date of Patent: Nov. 12, 2013

(54) SATELLITE DISTRIBUTION APPARATUS, CONTROL MEANS FOR USE IN SATELLITE DISTRIBUTION APPARATUS AND METHOD OF USE THEREOF

(75) Inventors: Stephen Beales, Shipley (GB); Philip Yates, Shipley (GB)

(73) Assignee: Pace plc., Shipley (GB)

( * ) Notice: Subject to any disclaimer, the term of this patent is extended or adjusted under 35 U.S.C. 154(b) by 1409 days.

(21) Appl. No.: 12/074,949

(22) Filed: Mar. 7, 2008

(65) Prior Publication Data

US 2008/0222682 A1      Sep. 11, 2008

(30) Foreign Application Priority Data

Mar. 10, 2007   (GB) .................................. 0704673.3

(51) Int. Cl.
*H04N 7/12*    (2006.01)
*H04N 7/50*    (2006.01)

(52) U.S. Cl.
CPC ...................................... *H04N 7/50* (2013.01)
USPC ............ 375/240.01; 375/240.02; 375/240.16; 375/240.26; 375/240.29; 375/308; 725/57; 725/58; 725/59; 725/69; 725/70

(58) Field of Classification Search
None
See application file for complete search history.

(56) References Cited

U.S. PATENT DOCUMENTS

| | | | | |
|---|---|---|---|---|
| 5,970,386 | A * | 10/1999 | Williams | 725/69 |
| 7,590,199 | B2 * | 9/2009 | Alagha | 375/347 |
| 7,603,075 | B2 * | 10/2009 | Barda | 455/3.01 |
| 8,086,170 | B2 * | 12/2011 | Petrovic et al. | 455/3.02 |
| 2007/0009064 | A1 * | 1/2007 | Cai et al. | 375/308 |
| 2008/0018802 | A1 * | 1/2008 | Yu | 348/728 |

OTHER PUBLICATIONS

Jiang H et al: "A Hierarchical Modulation for Upgrading Digital Broadcast Systems", IEEE Transactions on Broadcasting, IEEE Service Center, Piscataway, NJ, US, vol. 51, No. 2, Jun. 1, 2005, pp. 223-229, XP011132694, ISSN: 001 8-931 6, DOI: 10.1 109ITBC.2005.847619.*

* cited by examiner

*Primary Examiner* — Faruk Hamza
*Assistant Examiner* — Aixa A Guadalupe-Cruz
(74) *Attorney, Agent, or Firm* — Head, Johnson & Kachigian, P.C.

(57) ABSTRACT

Satellite distribution apparatus is provided for distributing digital broadcast signals in a pre-determined locality or building. The apparatus includes satellite receiving means for receiving broadcast signals from at least one satellite and communication means for transmitting the received signals to a control unit in the locality or building. The control unit allows a plurality of received digital broadcast signals to be selected and output onto a single cable for distribution around said locality or building. The control unit includes means for allowing the bandwidth of the selected signals to be compressed and rearranged for transmitting onto a single cable outlet. At least part of the means for compressing said selected digital broadcast signals includes signal symbol stacking means.

21 Claims, 23 Drawing Sheets

SATELLITE DISTRIBUTION APPARATUS, CONTROL MEANS FOR USE IN SATELLITE DISTRIBUTION APPARATUS AND METHOD OF USE THEREOF

CROSS-REFERENCE TO RELATED APPLICATIONS

This United States Application claims priority to British Patent Application No. 0704673.3 filed Mar. 10, 2007.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to satellite distribution apparatus, and particularly but not necessarily exclusively to satellite distribution apparatus within a building, control means for use with satellite distribution apparatus and a method of use thereof It is known to provide television systems including broadcast data receivers (BDRs) or set top boxes (STBs) for receiving digital data in the form of one or more data streams from one or more broadcasters via satellite, terrestrial and/or cable communication means. The BDRs or STBs process and decode the received data signals to generate audio, visual and/or auxiliary data therefrom. Data streams transmitted at different frequencies from the broadcaster(s) typically correspond to different services such as different television channels. The television system typically includes a display screen for displaying the generated visual data and speakers for sounding the generated audio data.

There is an increasing demand for providing a plurality of BDRs and/or STBs in a particular locality or building, such as one or more STBs in every apartment within a block of flats. However, there are a number of problems associated with providing a digital distribution system which allows a plurality of users to receive different selected digital signals within the same locality. Digital video broadcast satellite signals (e.g DVBS/DVBS2) are designed so that they can operate in the low carrier to noise environment (C/N) of the satellite link. As such the signals for satellite distribution typically have high symbol rates with a relatively simple symbol in order to achieve the required data throughputs within the low C/N characteristics of the satellite link. High symbol rates require high radio frequency (RF) bandwidths which are not as freely available within co-axial cables used to distribute the satellite originated signals around a building, but co-axial cables can offer high C/N characteristics. As such the signals for distribution within a co-axial cable typically have low symbol rates with a relatively complex symbol in order to achieve the required data throughputs within the low bandwidth of the co-axial cable link.

There are several known systems for distributing signals around a multiple dwelling building and these are listed below, together with the associated problems.

1. Intermediate Frequency (IF) distribution. This involves the distribution of each of the individual satellite feeds from the low noise block (LNB) of the satellite dishes around the building with an RF multi-switch to recombine the feeds for each individual apartment. This requires a set of several cables to be provided throughout the building which can be difficult to do, particularly if the building has already been built. In addition, the distribution set up is expensive. Furthermore, the number of cable feeds per apartment needs to be decided at the time of installation, thereby making the system inflexible in terms of expansion of the system at a later date. If more satellite dishes are added to the building, more cabling is required.

2. FTM Distribution. A Frequency Translation Module (FTM) selects a number of satellite signals according to requests from STBs within the building and translates the frequency of these signals to a new frequency plan that fits within a single cable. Only a limited number of channels can be delivered simultaneously (typically less than 32 users within a satellite IF bandwidth), thereby limiting the number of users of STBs within the building.

3. Re-broadcasting as a Cable Distribution. Each satellite signal is received and re-broadcast as a DVBC channel or channels on a single cable around the building. This includes taking a satellite modulated transport stream, demodulating it back to a transport stream and re-modulating it using a cable coding scheme. Not all satellite signals can fit within a single cable. The cost of equipment needed to implement the system is high and the STB has to be either non-standard or used an expensive adaptor.

4. Selected Re-broadcasting as a Cable Distribution. This system involves only re-broadcasting the signals that are being selected by the user's STB as a cable distribution. An example of this is the Pace Micro Technology PLC product known as Pace Multi-Dweller (PMD). A number of satellite signals are received according to requests from STBs within the building. Each received signal contains a transport stream that contains several programs. Each transport stream is de-multiplexed and filtered to remove all programs that are not required. The resulting requested programs are re-multiplexed to form new transport streams that fit within DVBC channels that are distributed on a single cable around the building. Although this system is less expensive compared to the Re-broadcasting Method of Point 3, it still suffers from the same problems of the Point 3 Method.

5. Analogue Re-broadcasting. This system involves re-broadcasting a selected number of channels as analogue signals on a single cable around the building. This system does not allow a complete line up of multi-channel television to be made available to user's within the building since it only places a pre-selected number of channels on the cable. These channels have to be chosen at the time of installation of the system or require a trained engineer to set up the system. Furthermore, the quality of analogue signals is generally poor compared to digital signals.

It is therefore an aim of the present invention to provide satellite distribution apparatus which overcomes the above-mentioned problems.

It is a further aim of the present invention to provide a method of using satellite distribution apparatus.

It is a yet further aim of the present invention to provide a control unit for use in satellite distribution apparatus which compressing a received digital broadcast data signal.

It is a yet further aim of the present invention to provide a method of using a control unit for controlling compression of a received digital broadcast data signal.

BRIEF SUMMARY OF THE INVENTION

According to a first aspect of the present invention there is provided a control unit for use in satellite distribution apparatus, said control unit having means to allow a plurality of received digital broadcast signals to be selected, means to allow the bandwidth of said selected signals to be compressed and rearranged for transmission onto a single cable outlet, and wherein at least part of the means for compressing said selected digital broadcast signals includes signal symbol stacking means.

Bandwidth compression using signal symbol stacking means reduces the bandwidth required to transmit a digital signal by increasing the carrier to noise ratio required to carry the signal without error. The technique is particularly advantageous for any communications system where the media through which the signal travel changes characteristics and provides an inexpensive method for re-coding the signal to suit the media. An example of a communications system where this aspect of the present invention is useful is where a transmitted signal is coded to pass from a lossy medium with high bandwidth to a relatively loss-less medium with restricted bandwidth.

Preferably a major proportion of the bandwidth compression of the present invention is provided by signal symbol stacking means in the form of one or more signal symbol stacking blocks. Decompression is typically achieved using signal symbol de-stacking means which are preferably in the form of one or more signal de-stacking blocks.

In order to stack symbols, for every 'n' symbol received by the signal symbol stacking means, said means generates a new symbol at 1/n of the received symbol rate. Preferably 'n' is an integer value.

Preferably n=4 for digital video broadcast satellite (DVBS) signals.

Preferably n=3 for digital video broadcast satellite 2 (DVBS2) signals.

The signals received by the stacking means typically are sent from signal demodulation means associated with the control unit, such as for example from a DVBS/S2 demodulator.

The direct mapping or remapping of symbols from one type to another without the need to recover underlying data (which typically requires forward error correction, energy dispersal, de-interleaving activities and/or the like) is an advantageous element of the present invention.

Further preferably at least part of the means for compressing the selected digital broadcast signals also includes base band shaped filtering means. This type of compression preferably only accounts for a minor proportion of the total bandwidth compression undertaken by the control unit.

In one embodiment the signal symbol stacking means rearranges the compressed signal by scaling the signal symbols. The scaling can be undertaken using a pre-determined factor. For example, the scaling can include scaling a first symbol vector V1 by a factor 'C' and adding the scaled first symbol to a second symbol V2 to provide a newly scaled vector O1=C×V1 and V2. A third symbol vector V3 can be scaled by the same factor C and added to a fourth symbol vector V4 and/or the like. The method of symbol mapping can be based on a simple linear function for mapping IQ symbols of the vectors from simple to complex form (i.e. summing and scaling symbols). Thus, according to one aspect of the present invention there is provided a method of symbol mapping of a digital broadcast data signal.

In one embodiment the method of symbol mapping is based on a non-linear function for mapping IQ symbols. This could also be described as a re-mapping function. Thus, in special cases vectors are remapped using one or more constraints.

In one embodiment the signal symbol stacking means rearranges the compressed signal by remapping the signal symbols (i.e. the incoming IQ symbol vectors are remapped to a new set of vectors). This remapping can also include scaling of the symbols if required. Thus, according to a further aspect of the present invention there is provided a method of symbol remapping of a digital broadcast data signal.

Preferably the single cable onto which the compressed and rearranged signals are output includes single cable co-axial distribution means.

Preferably conversion means are provided for receiving the compressed rearranged signal from a control unit, decompressing the signal and rearranging the components signals back to their original form using symbol de-stacking means.

The conversion means are typically located in the locality or building in which the control unit is provided and reconfigure the signals back to their original configuration for processing by broadcast receiving means provided in the locality or building.

Preferably the conversion means are located close to, adjacent to or inside the broadcast receiver means.

Preferably the broadcast receiving means is of a type for receiving digital data signals, processing and decoding said data to provide video data, audio data and/or auxiliary data for display on a display screen and/or for sounding via one or more speakers associated with the broadcast receiving means.

Preferably the broadcast receiving means is in the form of a set top box.

The conversion means can be in the form of a modified broadcast receiving means or set top box, adaptor means for use with broadcast receiving means and/or the like.

Preferably the control unit can operate in at least two different modes including a broadcast mode (BM) and a frequency translation module mode (FTM).

The control unit can be provided with programmable means to allow it to select which signals are compressed and output. The control unit can encode its output channel line-up and modulation parameters onto the output signals so that the broadcast receiving means and/or conversion means can determine where to find and how to decode the output signals.

Preferably back channel communication means are provided with the control unit to allow communication between a device receiving the compressed rearranged signals, such as an adaptor or broadcast data receiver, and the control unit.

In one embodiment the programmable means are programmed via the back channel from the broadcast receiving means and/or conversion means. In this mode the control unit operates in a conventional Frequency Translation Module mode (FTM) but it can support more than three times the number of users than a conventional FTM within the same RF bandwidth.

In one embodiment the signal symbol stacking means of the control unit compresses the bandwidth of the satellite signals using one or more channel cards.

Preferably the control unit includes signal distribution means to distribute an input signal feed from satellite receiving means to the channel cards and to control means. The control means typically sets the frequency of the compressed signals output from the channel cards.

Preferably RF signal combining means are provided in the control unit to combine a plurality of output signals from the channel cards into a single output signal. In addition, the RF signal combining means amplifies the signal to a required level.

Preferably the signal from the RF signal combining means passes through diplexing means prior to being transmitted on the single cable output feed from the control unit.

In one embodiment a low pass path of the diplexing means allows the back channel from the broadcast data receivers or adaptor means to be received by the control means.

Preferably the control unit can be moved between two or more different modes using mode control means. For example, the control means can operate in a broadcast mode or a FTM mode. The mode control means can signal the output frequency ranges available to use by the control means.

In one embodiment the mode control means includes one or more dip switches. In an alternative embodiment, the mode control means includes programmable memory means.

The signal distribution means can be in the form of a splitter, a satellite multi-switch and/or the like.

Preferably the control means includes at least one satellite tuner. The tuner can be used to scan input satellite signals to build up channel data relating to any or any combination of input signal frequency symbol rate, modulation mode and/or the like.

Preferably the control means includes an additional data feed that includes mapping data for allowing modulation of the frequency of the original signal feed to the rearranged signal feed. The additional data feed can be sent by a broadcaster, broadcast data receiving means, adaptor means and/or the like. Alternatively, the mapping data can be stored in memory associated with the control means.

Preferably the control means streams a data carousel to each channel card which is then combined with the satellite signals being compressed. The carousel data contains the channel plan including the original frequency symbol rate, modulation mode for each channel, together with the remapped frequency and compression mode.

In the FTM mode, preferably the carousel data also includes media access messages used to control the back channel and provide transmission opportunities for broadcast data receivers and/or adaptor means.

The control unit can be powered via any suitable means, such as a mains power supply, one or more batteries, solar powered and/or the like.

According to a further aspect of the present invention there is provided satellite distribution apparatus for distributing digital broadcast signals in a pre-determined locality or building, said apparatus including satellite receiving means for receiving broadcast signals from at least one satellite, communication means for transmitting the received signals to a control unit in the locality or building, said control unit allowing a plurality of received digital broadcast signals to be selected and output onto a single cable for distribution around said locality or building, said control unit including means for allowing the bandwidth of the selected signals to be compressed and rearranged for transmitting onto a single cable outlet, and wherein at least part of the means for compressing said selected digital broadcast signals includes signal symbol stacking means.

Preferably conversion means are provided in the locality or building for receiving the rearranged compressed digital signals and reconfiguring the signals back to their original configuration.

According to a yet further aspect of the present invention there is provided satellite distribution apparatus for distributing digital signals in a pre-determined locality or building, said apparatus including satellite receiving means for receiving broadcast signals from at least one satellite, one or more cables for transmitting the received signals from the satellite receiving means to a control unit in the locality or building, and means to output selected digital signals from the control unit onto a single cable for distribution around said locality or building, and wherein the means for outputting selected digital signals from the control unit onto the single cable is arranged so as to select one or more of the received signals, compress the bandwidth of said signals and re-arrange the original compressed signals into a new, different arrangement for transmitting onto the single cable.

Thus, the present invention provides an efficient means for reconfiguring the digital signals from a satellite in such a way that more signals can fit within a given cable bandwidth.

Preferably the satellite receiving means has low noise blocks that feed the satellite signals at the normal satellite intermediate frequency (IF) (i.e. 950-2150 MHz) onto the plurality of cables to the control unit.

The control unit can be located at any suitable location within the locality or building. In a preferred embodiment the control unit is located on a roof top of the building, such as for example adjacent to or integral with the satellite receiving means.

According to a further aspect of the present invention there is provided a method of using satellite distribution apparatus.

According to a yet further aspect of the present invention there is provided a method of compressing digital broadcast signals, said method including selecting a plurality of received digital broadcast signals, compressing and rearranging the bandwidth of said selected signals for transmission onto a single cable outlet, and wherein at least part of the means for compressing said selected digital broadcast signals includes signal symbol stacking means.

BRIEF DESCRIPTION OF THE DRAWINGS

Embodiments of the present invention will now be described with reference to the accompanying figures, wherein.

DETAILED DESCRIPTION OF THE INVENTION

Figure 1:
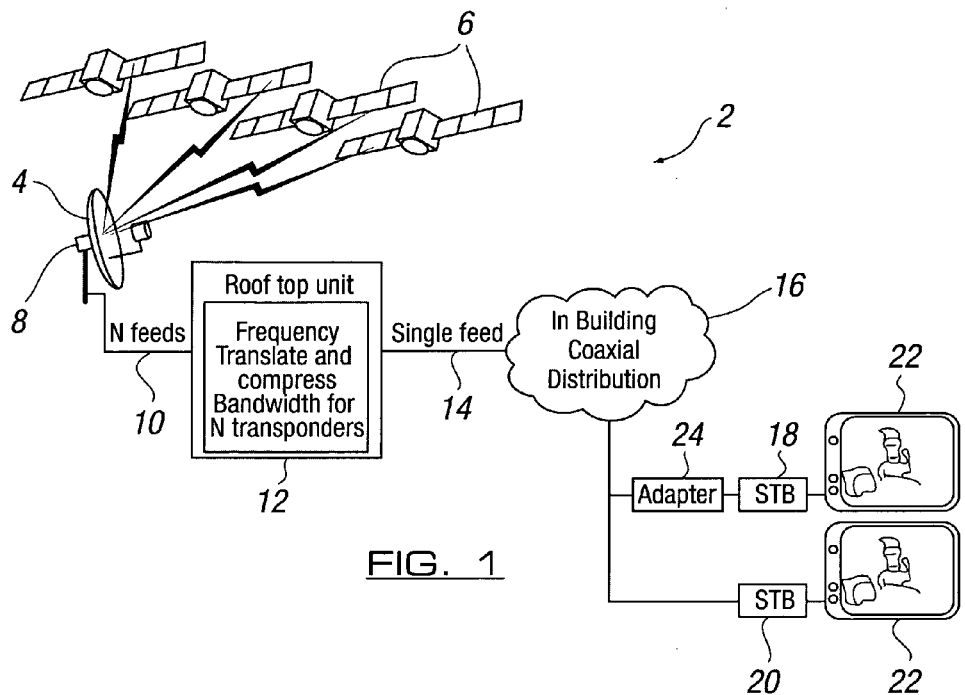
FIG. 1 is a simplified diagram showing some of the components satellite distribution apparatus according to an embodiment of the present invention.

Referring firstly to FIG. 1, there is illustrated a simple overview of satellite distribution apparatus 2 for a building according to an embodiment of the present invention where a number of users may demand different channel data to be transmitted via their set top boxes (STBs). Apparatus 2 includes satellite receiving means in the form of one or more satellite dishes 4 located on the roof of a building for receiving satellite signals from satellites 6. The satellite dishes 4 have low noise blocks 8 and feed the satellite signals at a normal satellite IF frequency on several cable feeds 10 to a control unit 12, which in this example is also located on the roof of the building.

In accordance with the present invention, control unit 12 selects some or all of the received signals, compresses the bandwidth of the selected signals and re-arranges the compressed selected channels into a new output arrangement. The output signal is then fed along a single cable 14 to a coaxial distribution system 16 and then to a plurality of STBs 18, 20 located in the building. The STBs process and decode the received signals to provide video data for display on display screens 22 and/or audio data for sounding via one or more speakers associated with the STBs.

The STB 20 can be specially adapted to include means to reconfigure one or more of the compressed and rearranged output signals back to the original satellite received configuration to allow processing and decoding of the signals. Alternatively, an adaptor 24 can be provided with the STB 18 to allow reconfiguring of one or more of the compressed rearranged output signals back to the original satellite received configuration.

Figure 2:
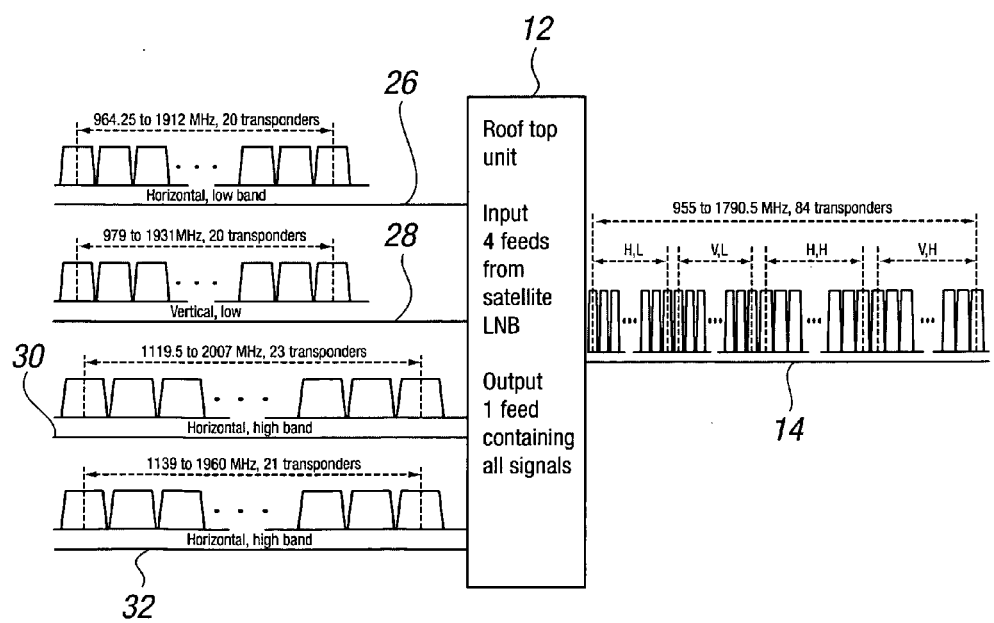
FIG. 2 is an example of compression and rearrangement of originally received satellite signals by the control unit according to an embodiment of the present invention.

FIG. 2 shows an example of the typical compression and channel plan that can be achieved by the control unit 12 for Eurobird 1 & Astra 2A/2B/2D satellites at 28.2 degrees east. From the satellites there are 84 transponders carrying Skydigital, Skyactive, BBC and Arqiva services. These signals occupy a total of 2942 MHz of RF bandwidth split across four feeds 26-32 (low and high bands each with horizontal and vertical polarisations). Once the four satellite feeds are compressed and rearranged by the control unit 12, these signals only occupy 835.5 MHz (compression 3.52:1) of RF bandwidth and can easily fit on a single cable feed 14. Thus, in this preferred embodiment, the control unit 12 is operating in a broadcast mode and no back channel is required.

Control Unit

Figure 3:
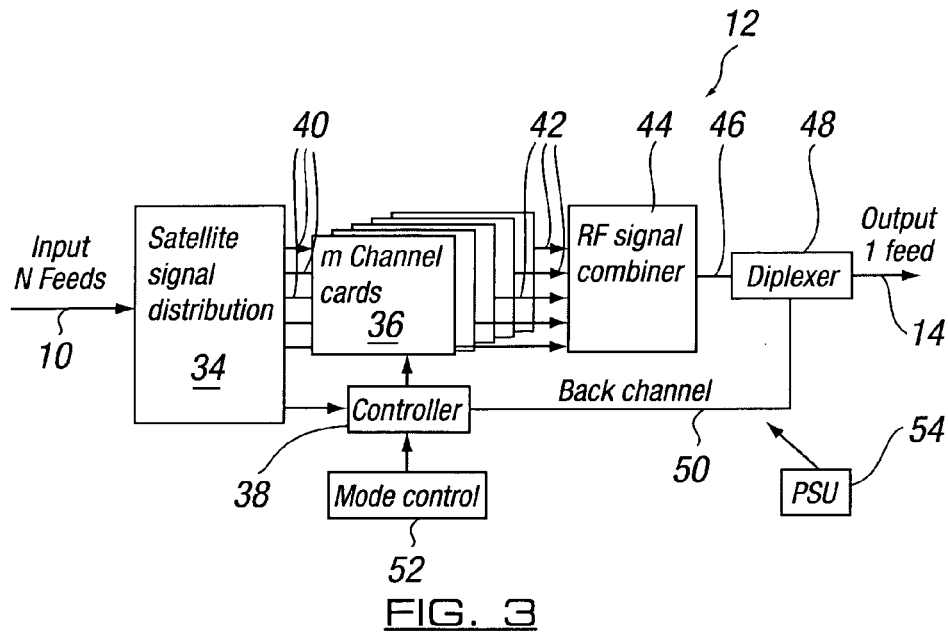
FIG. 3 is a simplified diagram showing the components of the control unit for use in one embodiment of the present invention.

Referring to FIG. 3, the control unit 12 is described in more detail. Control unit 12 includes signal distribution means 34 which distributes the input cable feeds 10 from the satellite LNBs 8 to channel cards 36 and to a controller 38. Each channel card 36 receives and compresses the bandwidth of a number of satellite channels 40 and produces a block of compressed output channels 42 at a frequency set by the controller 38. The frequencies for the outputs 42 from channel cards 36 are chosen so that the block of channels from each channel card can be combined by simple summation in an RF signal combiner 44. The RF signal combiner 44 combines all the output signals 42 from the channel cards 36 and amplifies them to a suitable level for launch onto the single output cable feed 14.

The output 46 from the RF signal combiner 44 passes through a high pass part of a diplexer 48 to the cable output feed 14. The low pass path of the diplexer 48 allows a back channel 50 from STBs 20 or adaptor 24 to be received by the controller 38, as will be described in more detail below. The controller 38 can operate in a number of different modes according to the settings within a mode control 52. The mode control 52 controls whether the control unit 12 is operating in a broadcast mode or a FTM mode and which output frequency ranges within VHF, UHF or L bands are available for use.

In its simplest form, the mode control 52 includes one or more dip switches. In a more complex form, the mode control 52 includes a non volatile memory that is either programmed at the time of installation of the system or programmed by down loading data sent via satellite or telephone line modem means. A power supply unit 54 is provided to convert power from a mains power supply to meet the supply requirements of the control unit 12.

The controller 38 typically provides all the control functions of control unit 12 and monitors the type of hardware connected to unit 12 (i.e., the type of signal distribution unit 34, the number of channel cards 36, the number of channels that each channel card 36 can compress and/or the like).

The signal distribution unit 34 can be a simple splitter in the case of a control unit designed to function with reception from a single orbital location, or a satellite multi-switch for control units designed to cope with signals from multiple orbital locations.

The controller 38 contains a satellite tuner (not shown) which it can use to scan the input satellite signals 10 to build up a channel table of input signals containing input frequency symbol rate and modulation mode.

Broadcast Mode

When the controller 38 is placed in a broadcast mode by mode control 52, the controller 38 maps each input frequency to an output frequency and a compression ratio and sets the channel cards 36 to perform the required compression according to control data from the mode control 52. In one embodiment, the controller 38 also streams a data carousel to each channel card 36. Each channel card 36 combines the carousel data with the satellite signals it is compressing. The carousel data contains the channel plan including the original frequency symbol rate and modulation mode for each channel along with the remapped frequency and compression mode. The data is used by STB 20 or adaptor 24 to relate the tuning commands from a standard electronic programming guide EPG to the settings required to decompress the signals from the control unit 12. In an alternative embodiment, the information carried in the carousel data is made available at the request of the STB 20 or adaptor 24 through a two way communication channel.

FTM Mode

When the controller 38 is in a FTM mode, the controller maps a single input frequency (normally the "home" or "guide" channel) to an output frequency and a compression ratio and sets a channel card 36 to perform the required compression according to control data from the mode control 52. The controller 38 also streams a data carousel to each channel card 36. Each channel card combines the carousel data with the satellite signals it is compressing. The carousel data contains the channel plan including the original frequency symbol rate and modulation mode for each channel along with the remapped frequency and compression mode.

In the FTM mode the carousel data may also contains media access control (MAC) messages used to control the back channel 50 and give transmission opportunities to any STB 20 or adaptor 24 present within the system. Initially the MAC message contains a timing reference and the number of users which thus relates to the number of transmission opportunities the control unit 12 can support. The number that can be supported is either limited by the number of channels that can be compressed by the fitted channel cards 36 or by the mode control 52.

To receive a satellite channel a STB 20 or adaptor 24 has to log onto the control unit 12 by picking an unused transmission opportunity (typically at random) and transmit a unique identity and channel request to the control unit. If the control unit successfully receives the message it will assign a channel within one of the channel cards 36 and set it to compress the requested channel. The channel information is added to the channel table and carousel data and the MAC message is altered to show that the transmission slot has been allocated to the STB or adaptor. The STB or adaptor is informed whether the process has been successful on receipt of an altered MAC message. The STB or adaptor can then tune to its allocated channel according to the carousel data. It now has an allocated transmission slot and all subsequent channel change requests are made within this slot (i.e. the slot is permanently allocated to the STB or adaptor). Periodically control unit 12 will request a repeat last channel change message to the STB or adaptor via a MAC message. If, after a time out period, the STB or adaptor has not responded, it is deemed to have entered standby and the allocated slot is released to the pool of unused slots. If, during a logon attempt, the STB or adaptor does not receive a MAC message indicating success after a time out period, the STB or adaptor will select another unused transmission slot (typically at random) and repeat the process.

Processing of Signals for Compression

A number of possible standard techniques for receiving a block of RF channels and processing them in parallel are available. These vary in the amount of signal processing that is carried out within the analogue domain as opposed to the digital domain. The exact design is a trade off between cost, performance, power consumption and space at the time of manufacture. The method of how each input signal is resolved to its individual sequence of symbols is not essential to the present invention. However, the processing applied to these symbols to produce the compression required is one of the main technical effects of the present invention.

Figure 4:
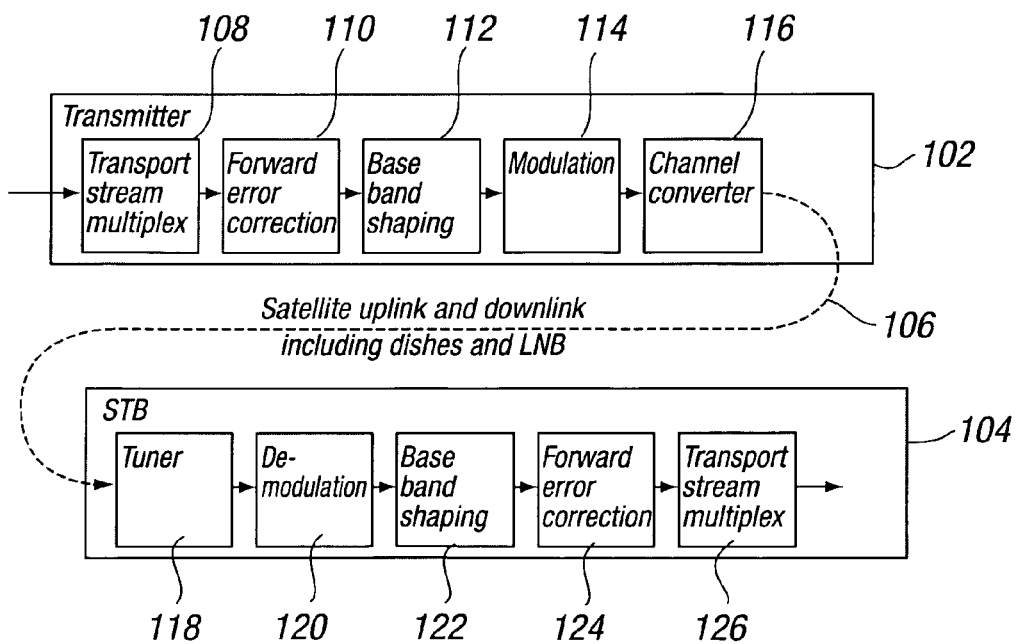
FIG. 4 illustrates a simplified conceptual DVBS/S2 processing chain for a broadcast signal and receiver in a prior art system.
Figure 5:
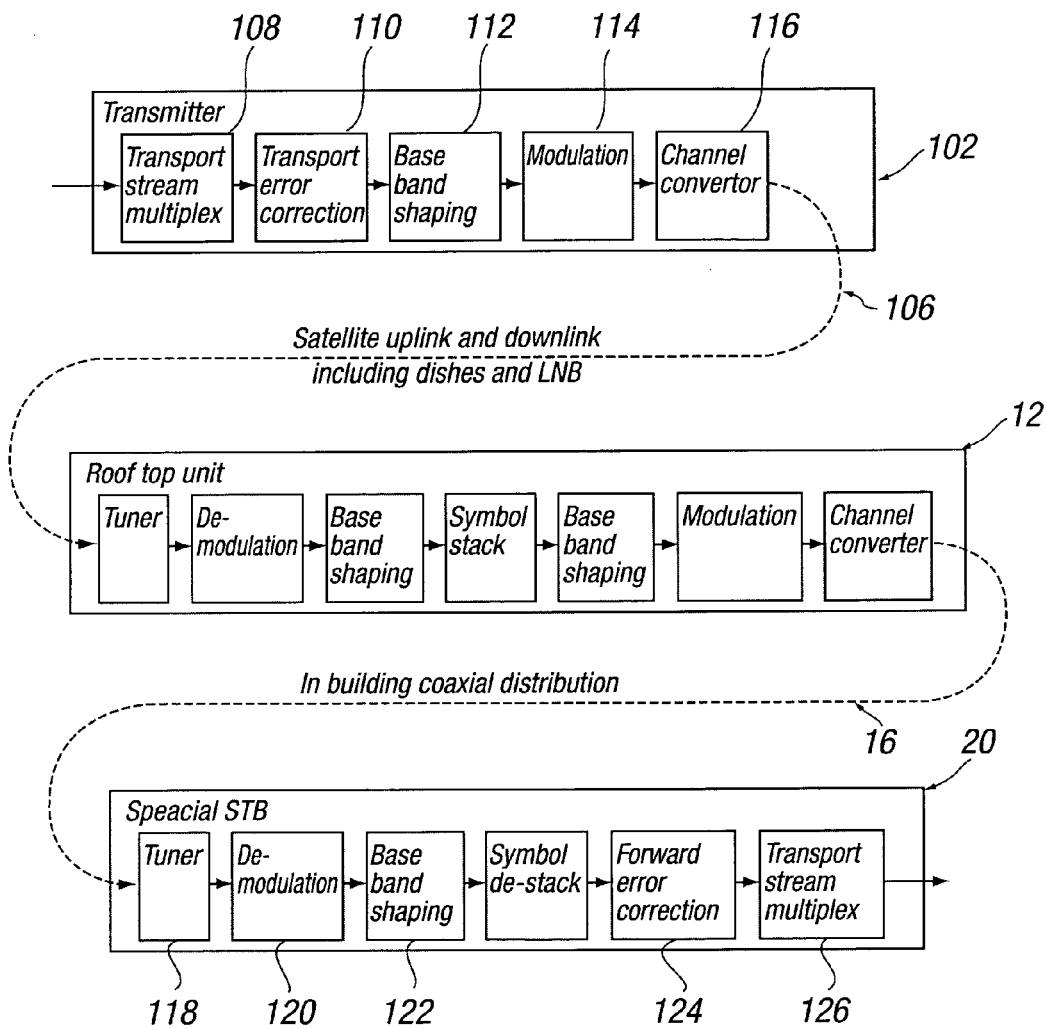
FIG. 5 illustrates a DVBS/S2 processing chain for an input signal to produce the required compression of the present invention including a control unit and a modified broadcast data receiver for receiving the compressed signals.
Figure 6:
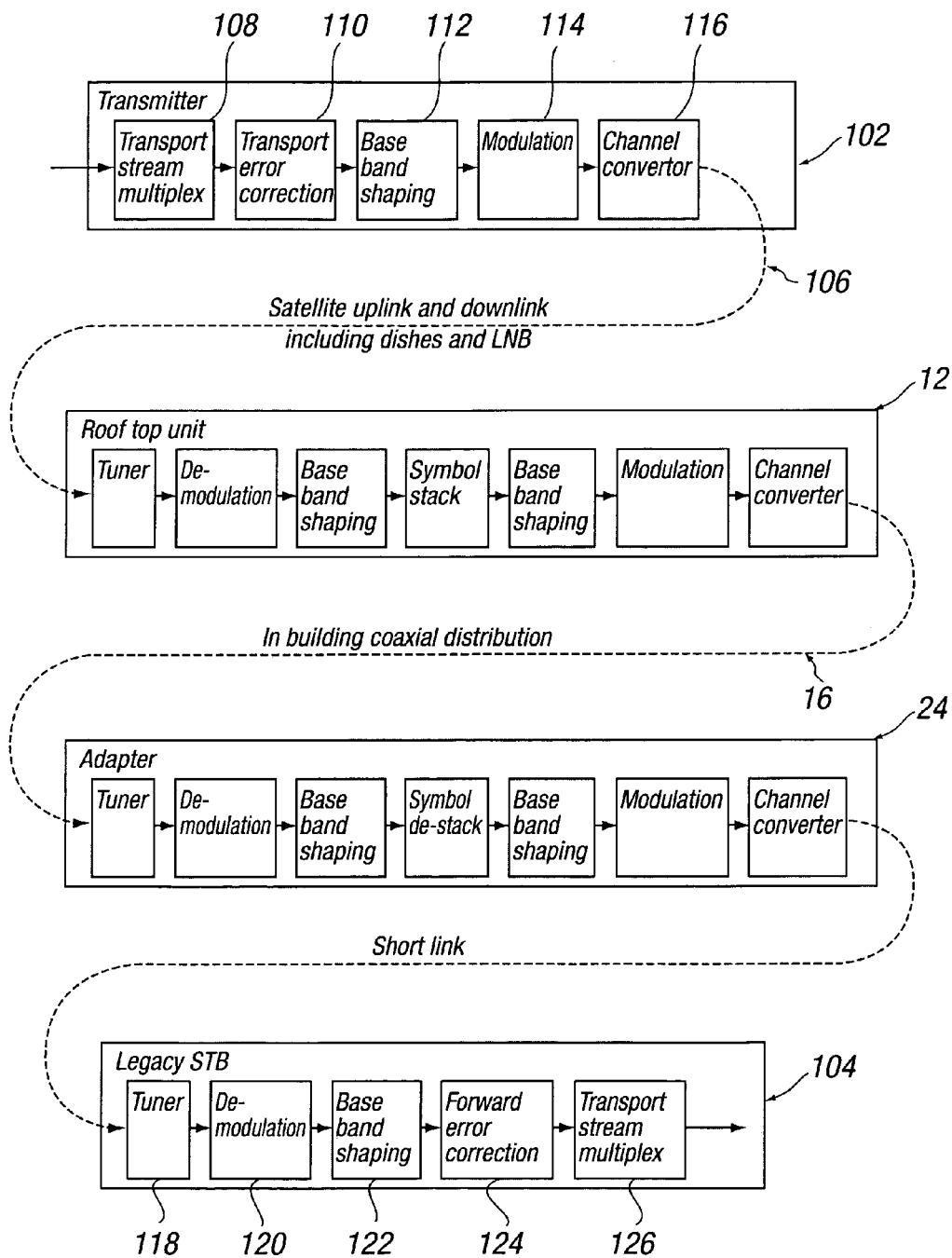
FIG. 6 illustrates a DVBS/S2 processing chain for an input signal to produce the required compression of the present invention including a control unit and an adaptor for use with a standard broadcast data receiver for receiving the compressed signals.

FIGS. 4-6 illustrate DVBS/S2 processing chains used to process the sequence of symbols in each input signal. FIG. 4 illustrates a prior art processing chain wherein data is simply encoded and delivered to a standard STB. Data is transmitted from a broadcaster via a transmitter 102 and is received by a standard STB 104 via satellite communication, a satellite dish at the building premises and a LNB provided with the dish (satellite communicated defined as 106). The transmitter 102 processes a data stream using a transport stream multiplexer 108, forward error correction 110, base band shaping 112, modulation 114 and channel conversion 116. The Forward Error Correction (FEC) 110 contains energy dispersal scrambling, inner and outer FEC codes and interleaving. The STB 104 receives the transmitted data stream via a tuner 118. The STB then processes the data stream using de-modulation 120, base band shaping 122, forward error correction 124 and a transport stream multiplexer 126.

FIGS. 5 and 6 illustrate DVBS/S2 processing chains according to embodiments of the present invention using a control unit 12 and a modified STB 20, as shown in FIG. 5 or an adaptor 24 and a standard STB 18, as shown in FIG. 6. Neither the control unit 12 nor the adaptor 24 requires the FEC 110, 124. This is the main signal processing saving over a system that converts a DVBS/S2 signal to a DVBC signal for distribution around the co-axial distribution within the building. This also means that the FEC still protects the signal as it travels in compressed format through the building coaxial distribution system.

Bandwidth compression in the present invention comes from two sources. The main amount of compression comes from the symbol stacking/de-stacking blocks, with some additional gain achieved by changing the coefficients within the base band shaping filters, as will be described in more detail below.

Symbol Stacking/De-Stacking Blocks

The main compression ratio of the present invention is achieved by symbol stacking. A specific example is described here and a more general description is provided later in the application.

In order to stack symbols, for every n simple symbols received from a DVBS/S2 demodulator, one complex symbol at 1/n times the symbol rate is generated. When n is an integer value, this keeps the processing simple. In one example, for a practical distribution within a co-axial cable, n=4 for DVBS signals and n=3 for DVBS2 signals. The direct mapping of symbols from one type to another without the need to recover the underlying data, which typically requires FEC, energy dispersal and/or the like is an important advantage of the present invention.

DVBS uses QPSK symbols which encode 2 bits per symbol; for every 4 symbols received 1 complex symbol is generated which encodes 8 bits; at a quarter of the symbol rate. This provides a bandwidth compression of 4:1.

DVBS2 contains several modulation modes but 8PSK symbols which encode 3 bits per symbol is most commonly used for broadcast video; for every 3 symbols received, 1 complex symbol is generated which encodes 9 bits; at a third of the symbol rate. This provides a bandwidth compression of 3:1.

The carrier to noise ratio C/N required within the co-axial distribution system 16 to carry a complex symbol encoding 9 bits per symbol is approximately 35 dB which is easily achievable within VHF/UHF bands (analogue TV signal distribution targets a minimum 43 dB). Thus, the present invention utilises the fact that the C/N environment on the single cable 14 is much less demanding than at the satellite link. For L band this is easily achievable for new wiring installations but for old installations with long cable runs this may not be possible. A simple solution in this case is to reduce the compression ratios to 3:1 for DVBS and 2:1 for DVBS2, thereby reducing the C/N requirement within the coaxial distribution to 26 dB. This still enables the control unit 12 of the present invention to support at least twice as many users than would be possible using a conventional FTM.

De-stacking is the reverse process of stacking. As such, to de-stack for every 1 complex symbol received at 1/n of the original symbol rate, an output of n simple symbols at the original symbol rate is required. Reconstructing the original symbol rate is easily achieved with a Phase Locked Loop (PLL) locked to the received symbol rate to produce an output rate equal to the original symbol rate at n times the received rate.

Base Band Shaping Filters

The second source of compression is achieved using base band shaping filters.

DVBS and DVBS2 typically use a root raised cosine filter with $\alpha=0.35$ for broadcast video. By using a root raised cosine filter with $\alpha=0.15$ for transmission from the control unit 12 to STB 20 or adaptor 24, compression in RF bandwidth required of 1.74:1 is achieved. When this compression is multiplied by the 3:1 ratio achieved by symbol stacking, it provides a combined compression of 3.52:1 for DVBS2 signals.

Figure 7:
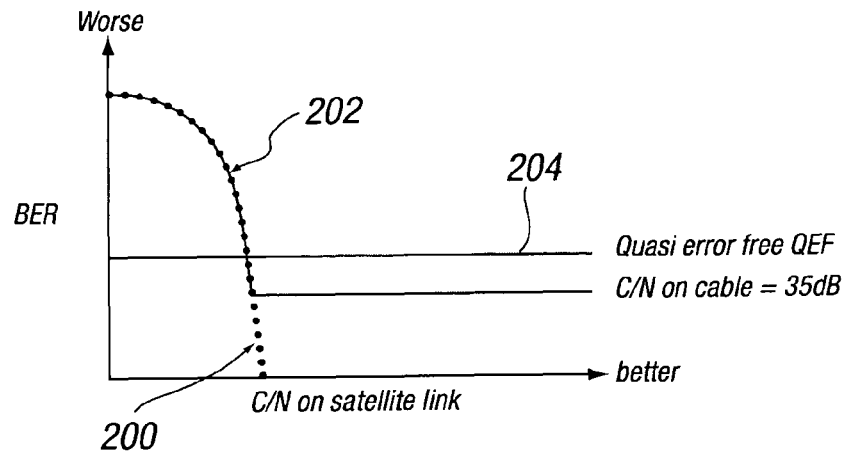
FIG. 7 illustrates the effect of stacking and de-stacking on the Bit Error Rate (BER) for the signal processing chain according to the present invention.

Receiving the satellite signal at the control unit 12 and resolving the symbol to its component bits has the effect of trapping any bit errors into the complex symbol that is launched from the control unit, but allows the complex symbol to be launched onto the co-axial distribution with broadcast quality C/N. The effect of stacking and de-stacking on the satellite bit error rate BER performance for the entire processing chain is shown in FIG. 7. The dotted line 200 shows the theoretical waterfall curve for the FEC used within a prior art satellite link alone. The solid line 202 shows the waterfall curve for the processing chain including the control unit 12 and modified STB 20 or adaptor 24 of the present invention. For the first part of the curve (low C/N on the satellite link), the BER performance is dominated by the satellite link. As the C/N on the satellite link improves, the BER improves following the theoretical curve until the point where the link between the control unit 12 and the STB 20 or adaptor 24 starts to contribute to the overall BER performance. From this point on there is a residual BER due in the building co-axial link. Providing the residual BER is less then the quasi error free (QEF) value 204 for the FEC chain as a whole then the whole system is QEF.

Carousel Data and MAC Messages

In its simplest form, the carousel data and MAC messages can be merged into the link by adding an extra bit to the complex symbol produced by the symbol stacker (e.g. 10 bit per complex symbol instead of 9). This produces a bit stream for carousel data and MAC messages that is in excess of 6.8 Mb/s for most Ku band satellites used for broadcast video. This is more than enough bandwidth to deliver the carousel data and MAC control messages. However, since it adds a 3 dB increase to the C/N requirement of the link between the control unit 12 and STB 20 or adaptor 24, it is not the most preferred embodiment.

The preferred method of adding the carousel data and MAC messages uses a statistical modulation technique which is a separate invention. It typically provides in excess of 73 Kb/s for most Ku band satellites used for broadcast video today while adding less than 0.1 dB to the C/N requirement of the link between the control unit 12 and STB 20 or adaptor 24. This is just enough to play out the entire data carousel for an 88 transponder system 4 times a second in the broadcast mode, or add less than 160 ms to a channel change time in FTM mode supporting 96 users.

Figure 8:
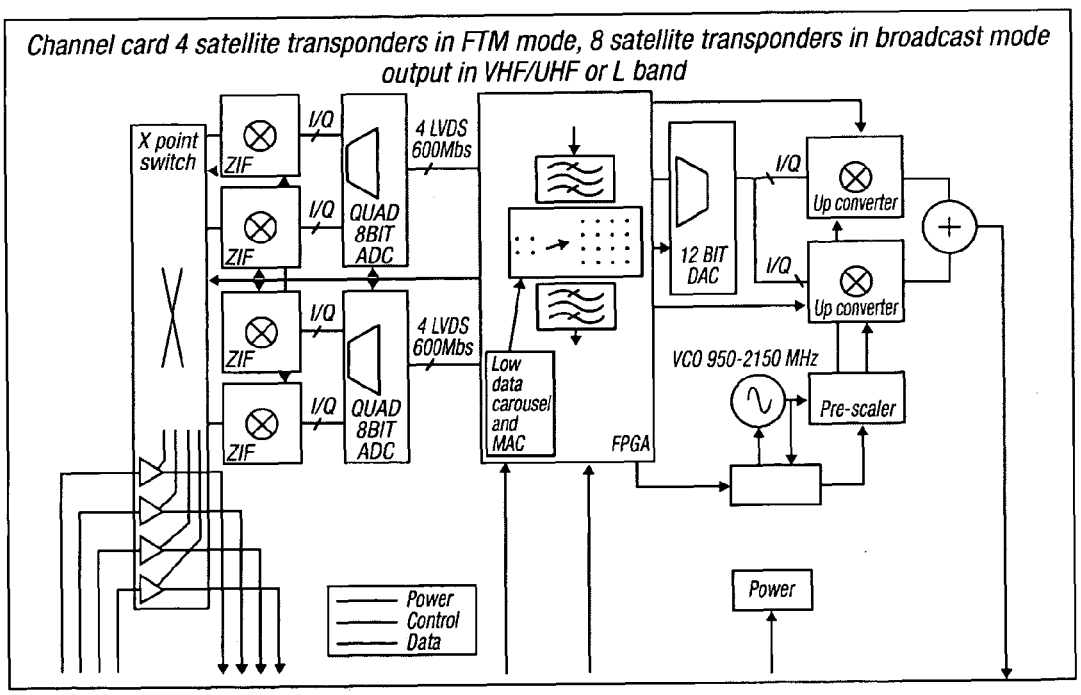
FIG. 8 shows an example design of hardware for a channel card used in the present invention.
Figure 9:
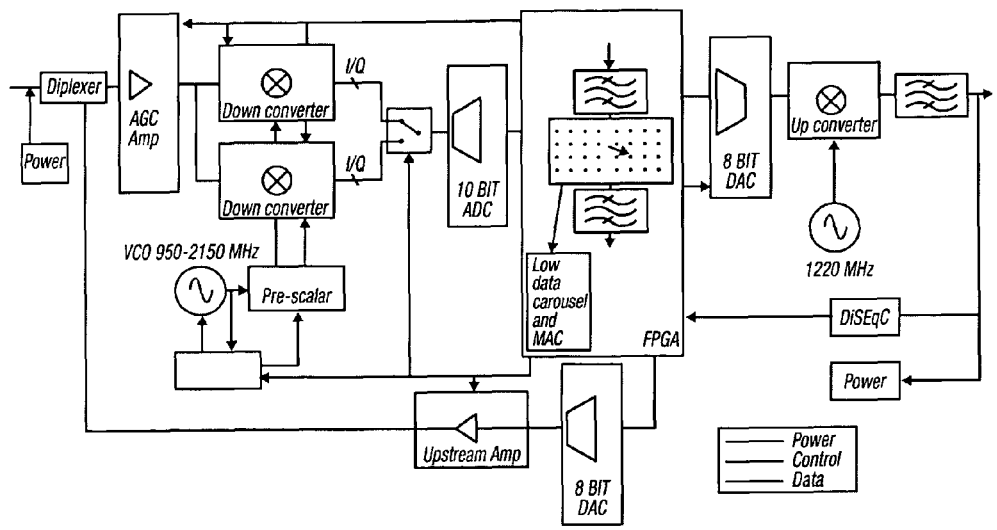
FIG. 9 shows an example design of hardware for use with an adaptor of the present invention.

FIG. 8 shows an example design of hardware for a channel card 36. A control unit 12 typically requires 11 such channel cards to operate in the broadcast mode for the 84 transponders carrying broadcast services from the Eurobird 1 & Astra 2A/2B/2D satellites at 28.2 degrees east and produce the output spectrum shown in FIG. 2.

Adaptor/Modified STB

The operation of modified STB 20 is similar to that for a standard STB 18 used with an adaptor 24 but some of the operations are not required.

The adaptor 24 is typically powered from the LNB supply of STB 18. The electronic program guide EPG of STB 18 must be set to FTM mode so that channel change messages are passed to the adaptor 24 using standard DiSEqC commands. The adaptor 24 receives the chosen channel from control unit 12 and de-compresses it to produce the original signal as received by control unit 12. This channel is then modulated to a fixed frequency within L band for reception by STB 18.

On "power up", the behaviour of adaptor 24 depends on whether it has been used on the system before. If the adaptor 24 has previously been used on the system, the adaptor tunes to its last known channel (if previously used in broadcast mode), or to the "home" channel (if previously used in FTM mode). If the adaptor 24 has not been used on the system before or if the last known channel is not found, it must scan to find a channel from control unit 12. Since the modulation mode and frequency are not known when scanning, the scan needs to be provided with pre-determined success criteria. The pre-determined success criteria used is the successful reception of carousel data as determined by the reception of successive Cyclic Redundancy Checks (CRC) within the data. This method is also used to synchronise the data.

Once the adaptor 24 has found a channel from the control unit 12, it caches a complete data carousel. If MAC messages are present, control unit 12 is in the FTM mode. If MAC messages are not present, the control unit 12 is in the broadcast mode. The adaptor is now ready to receive DiSEqC commands from the STB 18.

In FTM mode, when DiSEqC channel change messages are received from STB 18, adaptor 24 passes the channel request to control unit 12 according to its transmit opportunity as described by the MAC messages. If the channel is already present its presence is known from the carousel data and the adaptor can tune directly to the new channel and start decompressing and passing the channel to STB 18. If the requested channel is not already present, control unit 12 immediately adds the new channel definition to the data carousel as the next item to be transmitted, tunes a free channel within one of its channel cards 36 to compress the requested channel and begins to output it according to the definition added to the carousel. On receipt of the new channel description via the data carousel, adaptor 24 tunes to the new channel and begins to decompress it and pass it to STB 18. In this way the tuning of the channel within control unit 12 and adaptor 24 takes place substantially in parallel.

In broadcast mode, the operation is much simpler as all channels are always present. When a DiSEqC channel change message received from STB 18, adaptor 24 can tune immediately to the new channel and begin decompressing it and passing it to STB 18.

For a modified STB 20, control aspects normally provided by adaptor 24 are performed within the tuner driver layer of the STB software. In this way the middle-ware and application layers (EPG) of the STB software can be unaware that the control unit 12 is present. This allows for rapid development of modified STBs for use with a control unit 12 once the de-stacking hardware is included within the STB.

Thus, the present invention has the advantage of providing an efficient method for reconfiguring digital signals that have been designed for transmission over one medium (e.g. a free space satellite link) so that they are better suited to the transmission characteristics of another medium (e.g. a co-axial cable within a building). In addition, it allows the distribution of satellite signals to a greater number of users within a locality or multiple dwelling building than is possible with prior art methods.

A General Method of Signal Mapping of Symbols using Symbol Stacking Means

Figure 10:
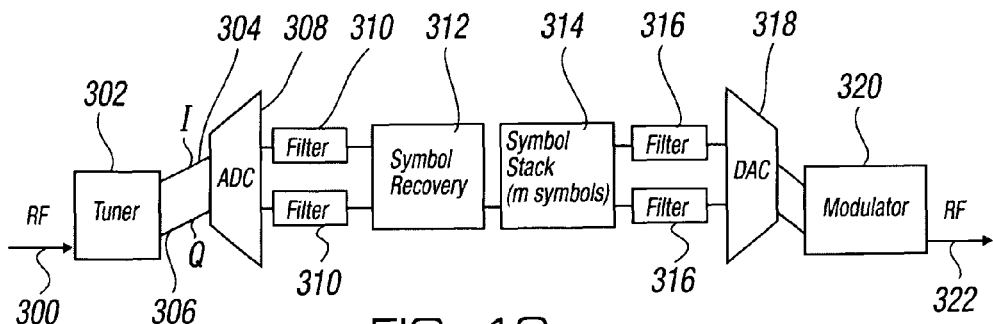
FIG. 10 illustrates an example of symbol stacking means for use with a symbol mapping method according to one aspect of the present invention.

Referring to FIG. 10, there is illustrated an example of symbol stacking means for achieving data compression by signal mapping of symbols.

An RF signal 300 is received by a tuner 302 and the individual I-Q symbols 304, 306 are passed through an analogue to digital converter (ADC) 308, filtered by filters 310 and the symbols are recovered by symbol recovery means 312 at the symbol rate S of the coding of the received signal. The symbols are then stacked as described below using symbol stacking means 314 so that m input symbols form a single more complex output symbol. (m is an integer). Symbols are output from symbol stacker 314 at a rate equal to S/m. The sequence of output symbols is then filtered by filters 316 to prevent inter-symbol interference (e.g. root raised co-sine), passed through a digital to analogue converter (DAC) 318 and modulated by modulator 320 to an RF output 322.

The bandwidth of the RF output 322 is typically reduced by a factor of m compared with the RF input 300 but carrier to noise (C/N) of the output channel will have to be better than that of the input by a value XdB.

where X=C.m and C (dB) is a constant for the original symbol.

C can be as low as 6 dB (QPSK input). Thus a reduction in bandwidth by a factor of 4 for QPSK system requires an output channel that has a C/N 24 dB better than the input channel for no symbol loss.

Figure 12:
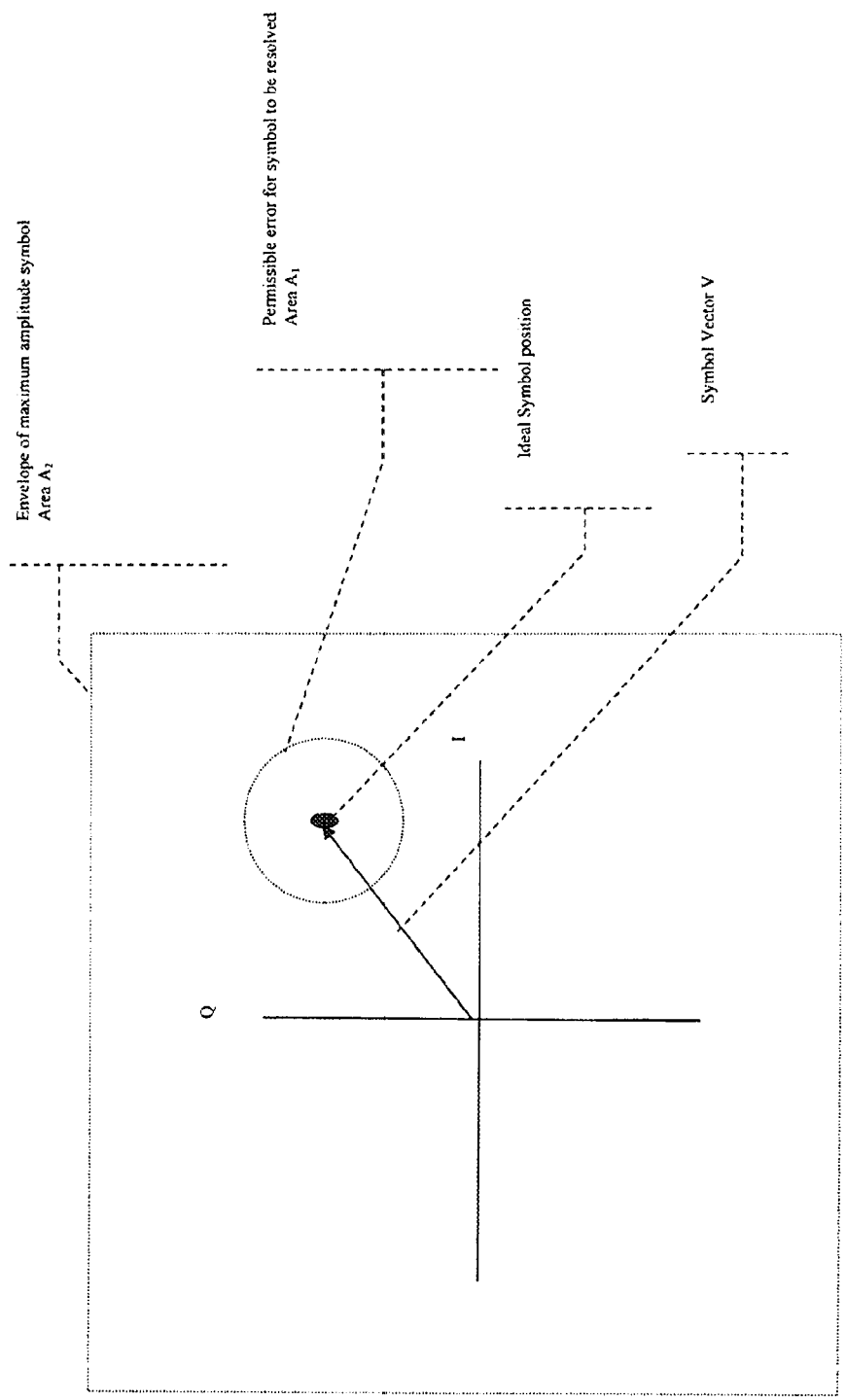
FIG. 12 illustrates a vector diagram of symbol stacker means with generic symbols.

The symbol stacker means 314 is shown in FIG. 12 with generic symbols

Consider a single generic symbol.

The C/N required to receive this symbol is given by $C/N = 10.\log(A_2/A_1)$

Consider a sequence of such symbols $\{V_1, V_2, V_3, V_4 \ldots\}$

| Symbol 1 vector $V_1$, | Symbol 2 vector $V_2$, | Symbol 3 vector $V_3$, | Symbol 4 vector $V_4$ |
|---|---|---|---|
|  |  |  |  |

Figure 13:
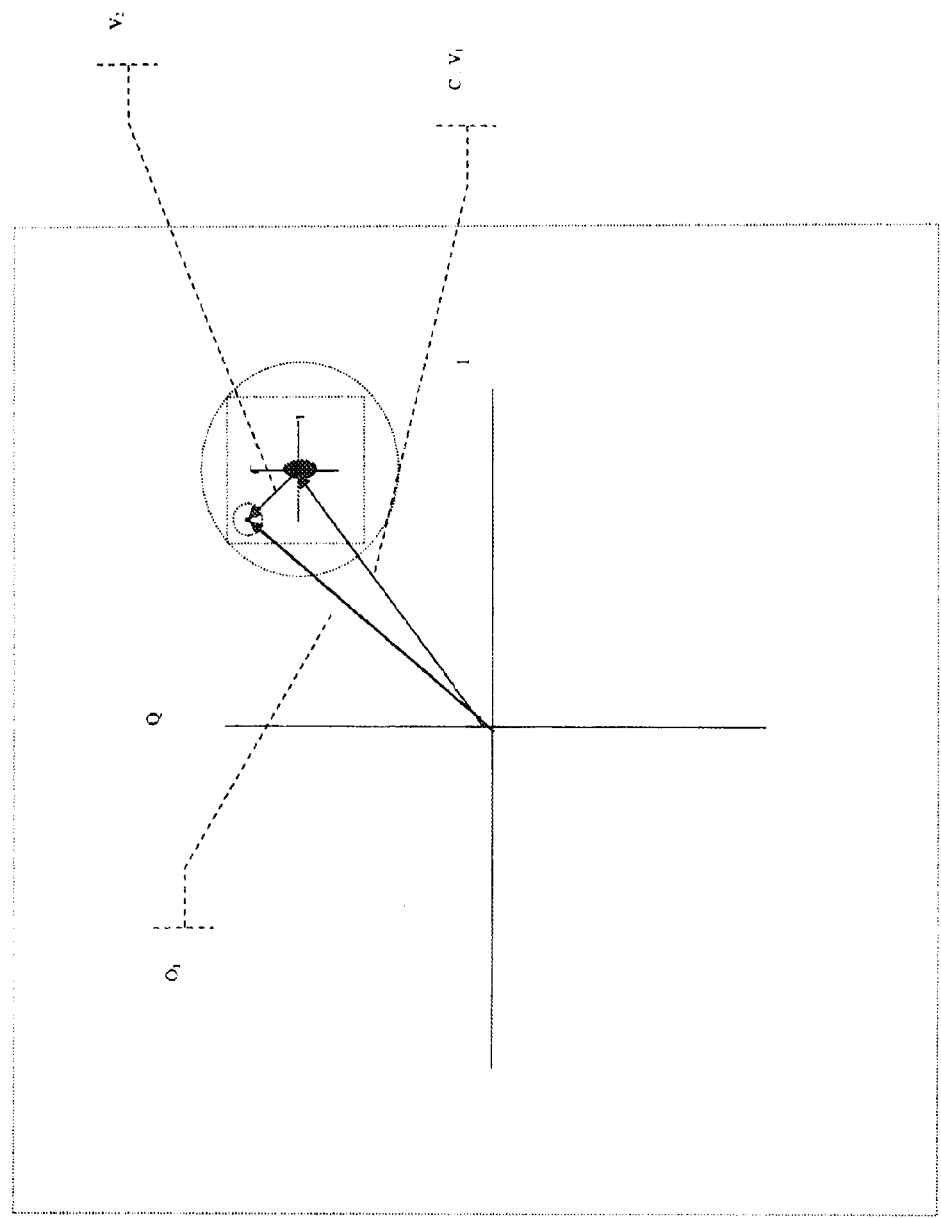
FIG. 13 illustrates a vector diagram of symbol stacker means.

Scaling as a linear function the first symbol by a scale factor C and adding second we have a new vector $O_1 = C.V_1 + V_2$ as shown in FIG. 13.

The scale factor C is sufficiently large such that the envelope of maximum amplitude of all the possible non-scaled symbols (vector $V_2$) fits within the scaled permissible area of error for the scaled symbol (vector $V_1$)

Figure 14:
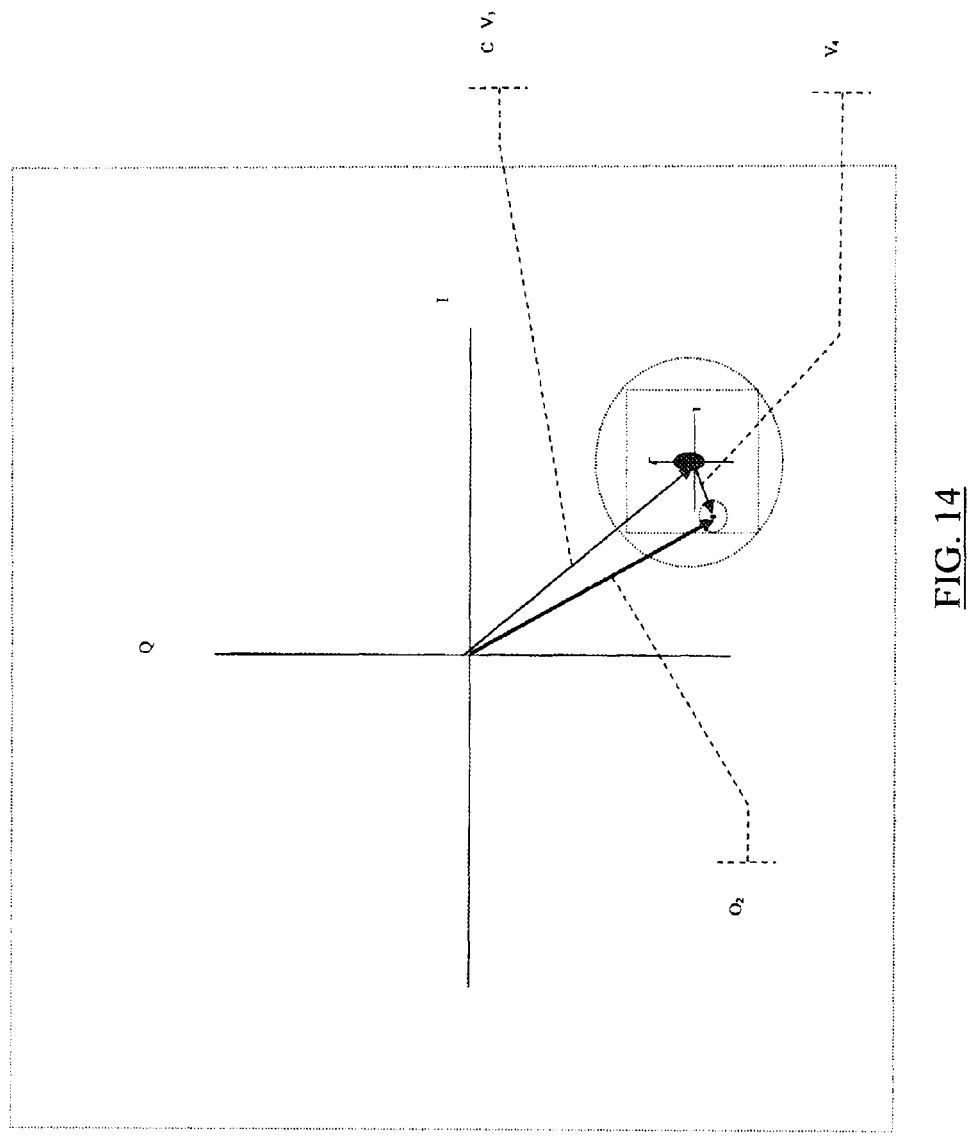
FIG. 14 illustrates a vector diagram of symbol stacker means.

Scaling the third symbol by a scale factor C and adding fourth we have a new vector $O_2 = C.V_3 + V_4$ as shown in FIG. 14.

Thus we have reduced the sequence of symbols $\{V_1, V_3, V_3, V_4 \ldots\}$ to a new sequence $\{O_1, O_2 \ldots\}$ at half the symbol rate. Each symbol in the new sequence contains within it two symbols from the original sequence. The original sequence $\{V_1, V_2, V_3, V_4 \ldots\}$ can be resolved from the new sequence $\{O_1, O_2 \ldots\}$ after transmission through a media providing the scale factor C used to generate the new sequence is large enough and the C/N ratio of the transmission media is given by.

$C/N \geq 10.\log(C.A_2/A_1)$

This general process can be used to stack any number of symbols.

To resolve the new symbol sequence $\{O_1, O_2 \ldots\}$ back to its original sequence $\{V_1, V_2, V_3, V_4 \ldots\}$ the stacking principle is reversed.

Assuming that the demodulator used to recover the original sequence contains AGC then the symbol $O_1$ is resolved using the same demodulator used to resolve the original sequence to recover the symbol $V_1$. The remainder $(O_1 - V_1)$ is then demodulated again to recover $V_2$.

If the original scale factor C is known then both symbols $V_1$ and $V_2$ can be recovered in a single demodulation process from the symbol $O_1$.

The above method can be applied to QPSK and 8PSK Symbols as will described below.

For a symbol stacker with QPSK symbols

Figure 15:
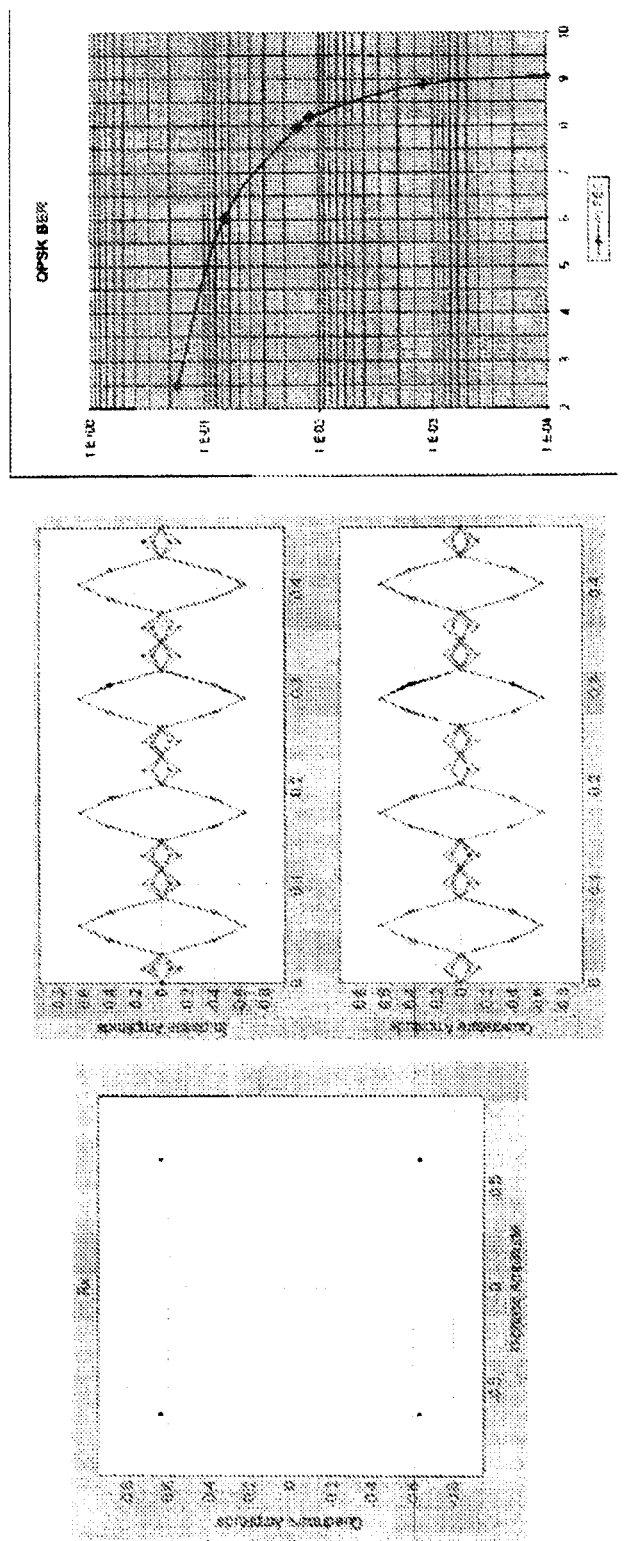
FIG. 15 illustrates graphs and a chart of QPSK modulation.

As an example to illustrate multiple stacking consider a simple QPSK modulation. The constellation and eye diagrams (4 points per symbol) are illustrated in FIG. 15 along with a waterfall diagram of BER against C/N.

Figure 16:
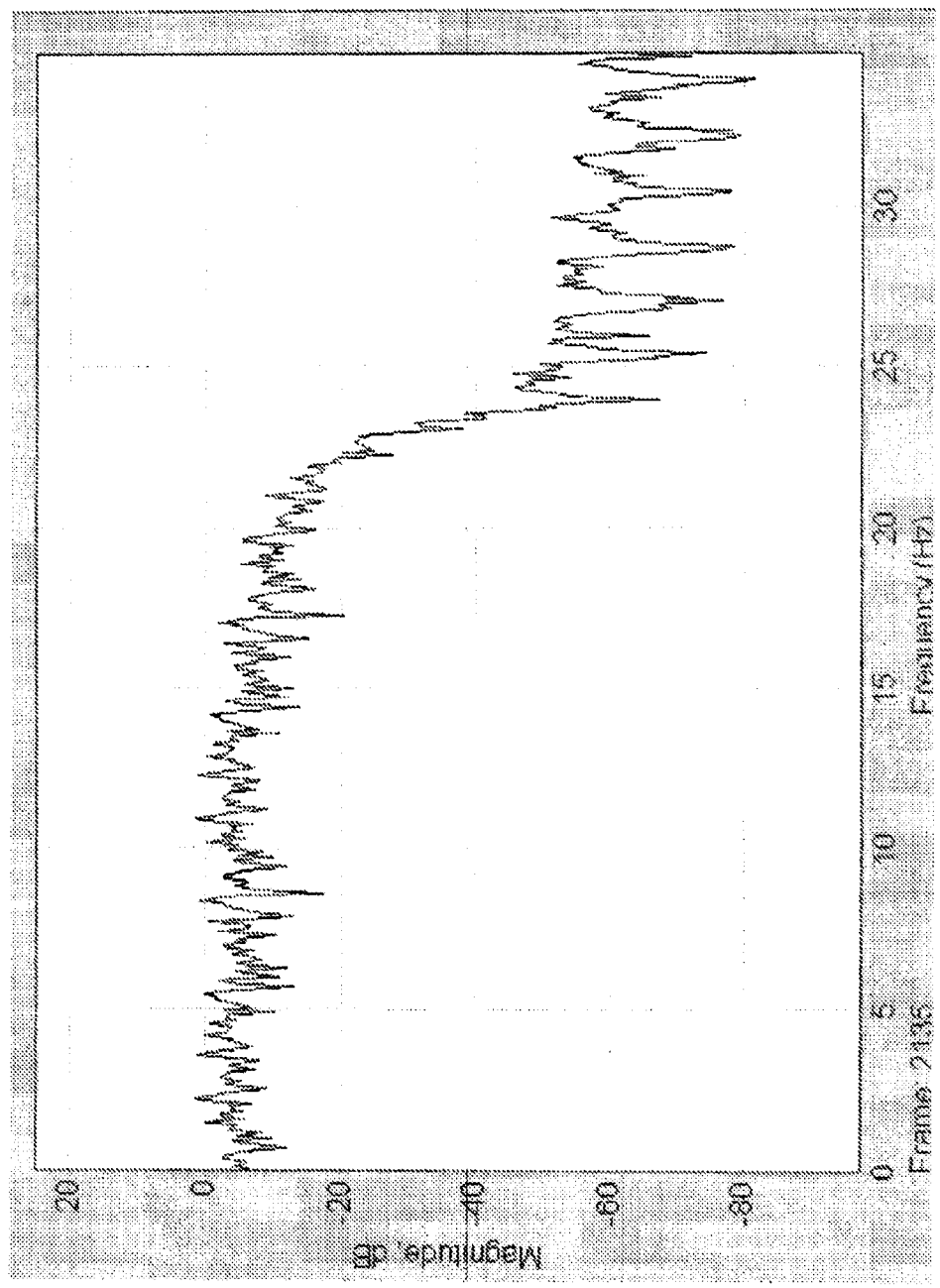
FIG. 16 illustrates a diagram of a signal spectrum.

Assuming a root raised cosine channel limiting filter with α=0.35 (as used on ASTRA) this signal is represented by the spectrum shown in FIG. 16.

Figure 17:
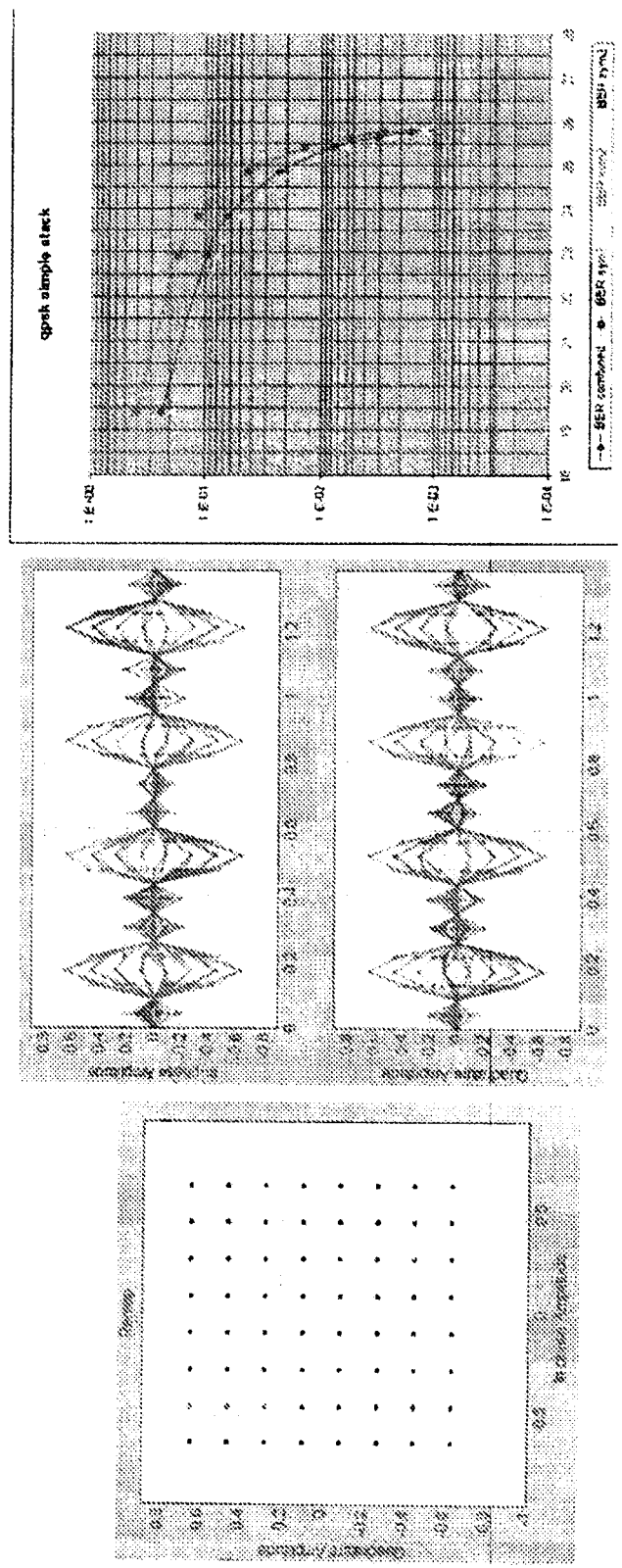
FIG. 17 illustrates graphs and a chart of signal mapping.

Note the frequency axis is not to scale is representative for comparison with the spectrum for the stacked symbol below Re-mapping 3 consecutive symbols $V_1, V_2, V_3$ to a new complex symbol $O_1$ using the formula $O_1 = V_1 + 2.V_2 + 4.V_3$ We have a new constellation, eye and waterfall diagram as shown in FIG. 17.

Figure 18:
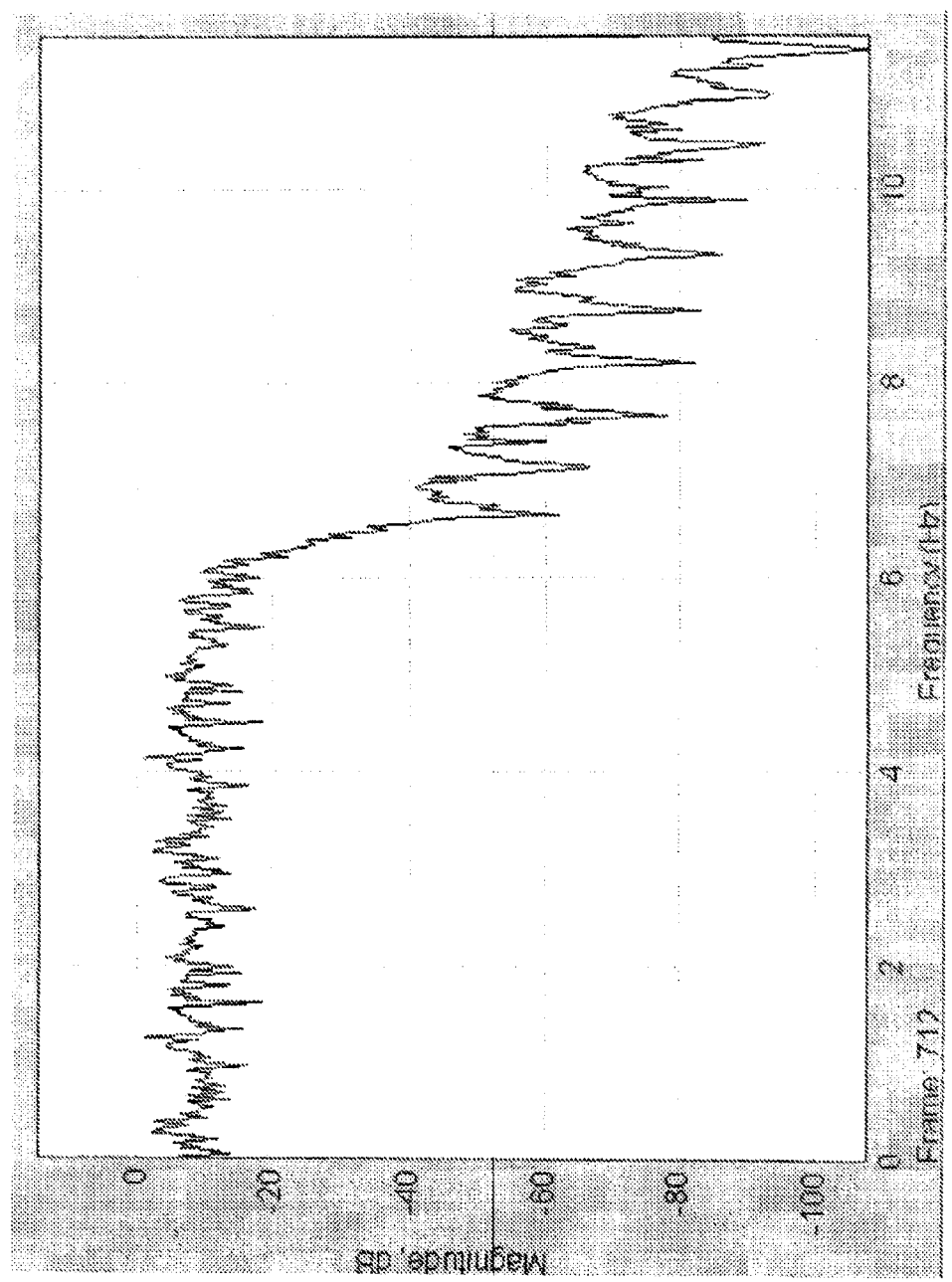
FIG. 18 illustrates a diagram of a signal spectrum.

Assuming a root raised cosine channel limiting filter with α=0.12 (as used on J.83 annex B) this signal is represented by the spectrum shown in FIG. 18.

From comparison between the frequency plots the symbol stacking has reduced the bandwidth requirement by a factor of 3.5 (factor of 3 due to symbol rate reduction and the rest due to the change in roll-off factor α). The C/N requirement for a BER of 1e-4 without forward error correction TEC) has increased from 9.1dB to 25.8 dB. This is well within the C/N capacity for transmission within a co-axial cable.

The symbol stacker with 8PSK symbols

Figure 19:
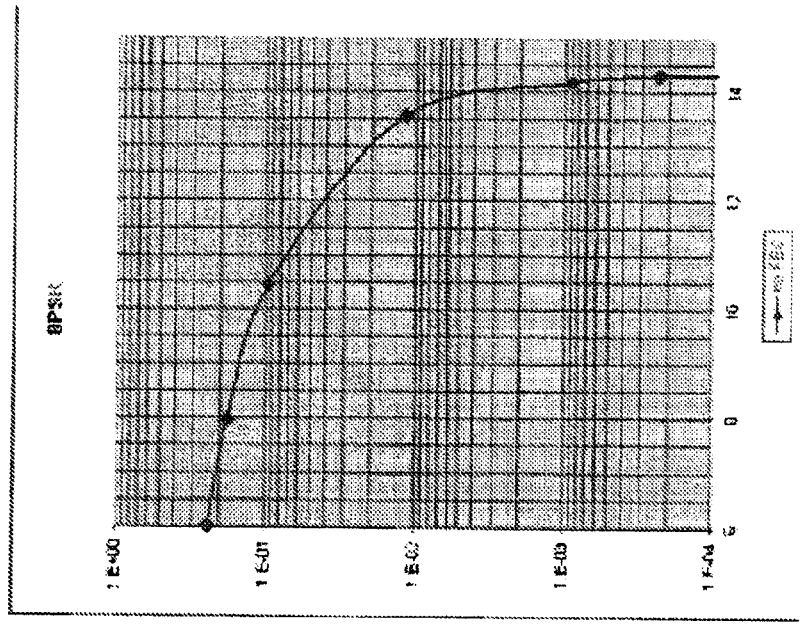
FIG. 19 illustrates a graph and chart of 8PSK modulation.
Figure 19:
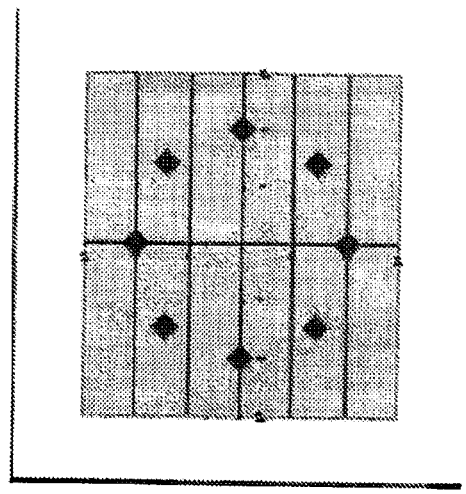

The more complex the initial symbols the higher the required C/N for the transmission within a media. Considering 8PSK. used for broadcast TV distribution within the DVBS2 standard, constellation and waterfall diagrams as shown in FIG. 19.

Re-mapping 3 consecutive symbols $V_1, V_2, V_3$ to a new complex symbol O1 using the formula $$O_1 = V_1 + 3.8 \cdot V_2 + 13.8 \cdot V_3$$

Figure 20:
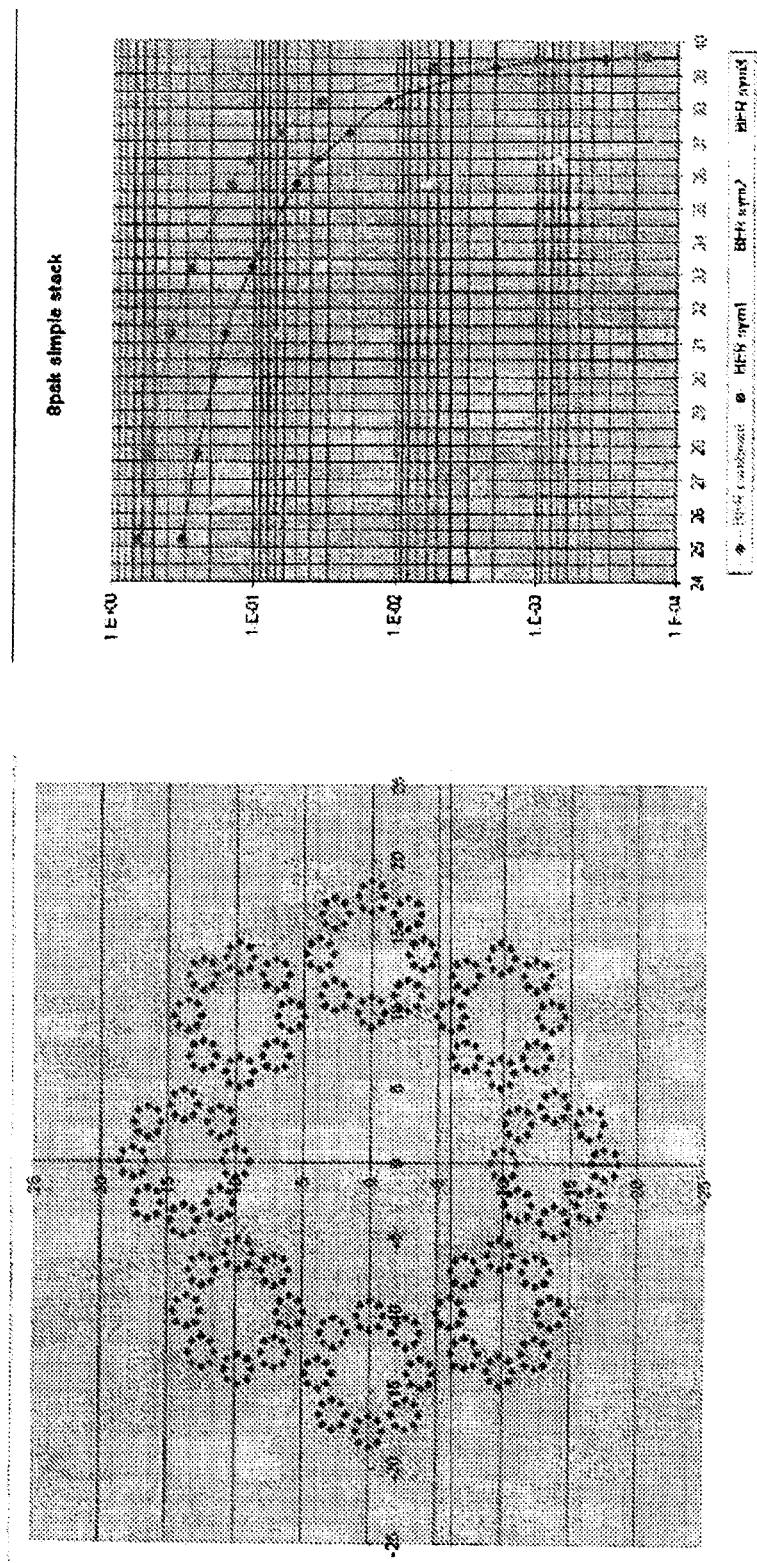
FIG. 20 illustrates a graph and chart of a signal spectrum.

We have a new constellation and waterfall diagram as shown in FIG. 20.

Again the bandwidth requirement is reduced by a factor of 3.5 (factor of 3 due to symbol rate reduction and the rest due to the change in roll-off factor $\alpha$). The C/N requirement for a BER of 1e-4 without FEC has increased from 14.3 dB to 39.5 dB. This is within the C/N capacity for transmission within a co-axial cable depending on the length of the cable run and transmission frequencies used.

The waterfall curves given for both examples are based purely on the geometry of the symbols concerned, and do not include any allowance for FEC coding within the original symbols. However nothing within the transformation process has changed any FEC coding within the original sequence, and the original sequence can be recovered from the transformed symbols.

It is worth noting that for the stacked 8PSK symbol that above 37 dB the BER is dominated by errors only in one in every three original symbol. Any FEC coding that performs well in this condition could reduce the C/N requirement on the cable for the 8PSK stacked symbol to 37 dB.

The Effect of Symbol Stacker Means on Link Budget

Consider a domestic satellite receiver or STB. A low noise block (LNB) attached to a dish antenna on the roof feeding a signal down (up to 100 m) of cable to a set top receiver and TV in a living room.

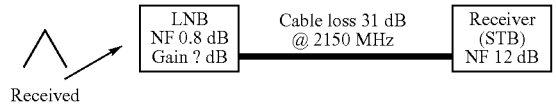

The effect of the receiver noise figure and cable loss on the overall system noise figure depends on the gain of the LNB as indicated by the table below

| LNB quality | LNB dB | gain combined NF | system |
|---|---|---|---|
| High | 60 | 0.87 | |
| Typical | 55 | 1.02 | |
| Typical | 50 | 1.47 | |
| Poor | 45 | 2.63 | |
| Poor | 40 | 5.05 | |

By placing a receiver closer to the LNB the overall noise figure is reduced as indicated by the table below.

| LNB quality | LNB gain dB | system without receiver | NF close stacker | NF with symbol C/N improvement |
|---|---|---|---|---|
| High | 60 | 0.87 | 0.80 | 0.07 |
| Typical | 55 | 1.02 | 0.80 | 0.22 |
| Typical | 50 | 1.47 | 0.80 | 0.67 |
| low | 45 | 2.63 | 0.80 | 1.83 |
| Poor | 40 | 5.05 | 0.81 | 4.24 |

By converting the received satellite signal (dimensioned for transmission in free space) to a signal more suited to transmission within the cable the overall system noise figure is improved. This improvement is small for high quality LNBs but significant for typical and low quality LNBs giving better overall performance for the poor quality low gain LNB than for the high quality high gain LNB without the intermediate receiver/symbol re-stacker.

The symbol stacker must produce an output that is of sufficient amplitude and C/N ratio to be received by the final receiver or STB. This is a function of the maximum symbol rate and symbol used. An example calculation is given below

| From satellite | |
|---|---|
| Symbol rate from satellite | 30 MS/s |
| Symbol 8PSK DVBS2 | 3 b/S |
| C/N for QEF not relying on FEC | 14.5 dB |

| Out of symbol stacker | |
|---|---|
| Symbol rate from stacker | 10 MS/s |
| Symbol stacked 8PSK | 9 b/S |
| C/N for QEF not relying on FEC | 39.5 dB |
| Channel bandwidth ($\alpha = 0.12$) | 11.2 MHz |
| Thermal noise (KTB) | 4 dBµV |

Output power required = thermal noise + receiver noise figure + required $C/N$ + cable loss

= 4 + 12 + 39.5 + 31 @ 2150 MHz

= 87.5 dBµV @ 2150 MHz

This output power requirement is within the capability of domestic equipment.

To reduce the symbol stacker re-modulator output power requirement further the symbol stacker does not have to output the received transponder at the same frequency.

From the graph of cable loss for typical domestically installed cable (CT100) the loss at 1000 MHz is 21 dB/100 m $$\Rightarrow \text{Output power required} = 4 + 12 + 39.5 + 21 @ 1000 \text{ MHz}$$
$$= 77.5 \text{ dB}\mu\text{V} @ 1000 \text{ MHz}$$

Figure 21:
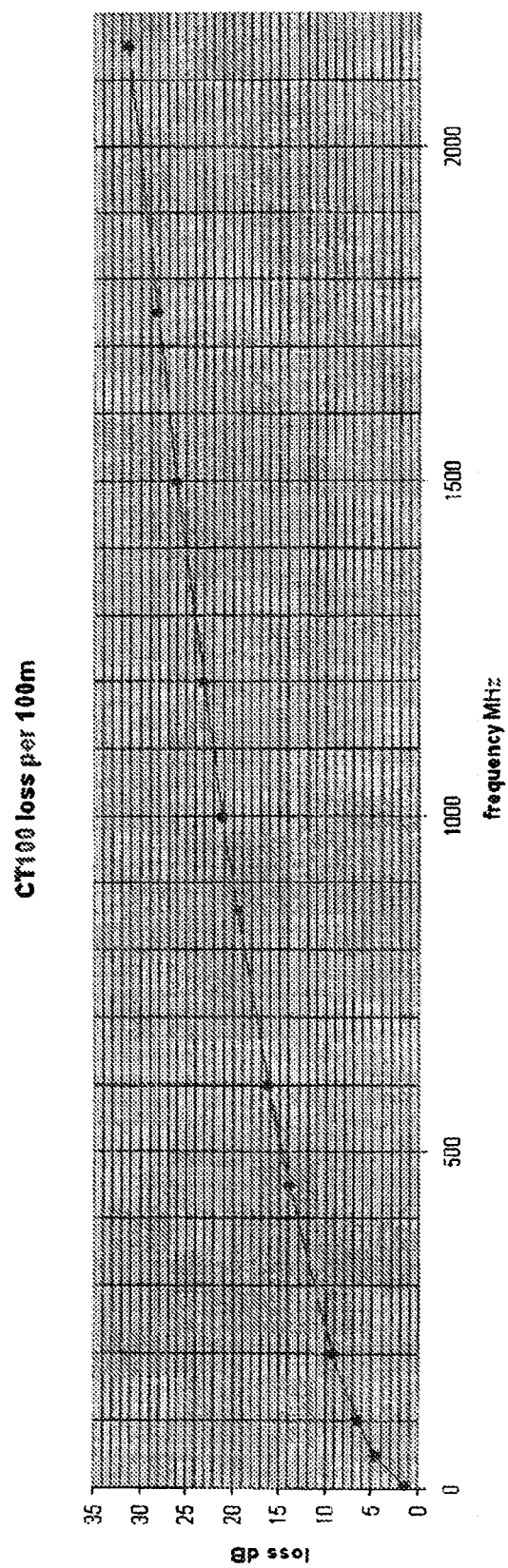
FIG. 21 illustrates a graph of cable loss.

This is less than the output power of a typical VHF/UHF modulator use in a DVD player or games console as shown in FIG. 21.

Between 125 MHz and 1000 MHz there is sufficient space to carry 78 off 11.2 MHz which is more than the total number of transponders for the ASTRA 2 satellite (28.2E).

A General Method of Signal Re-Mapping of Symbols using Symbol Stacking Means

Figure 11:
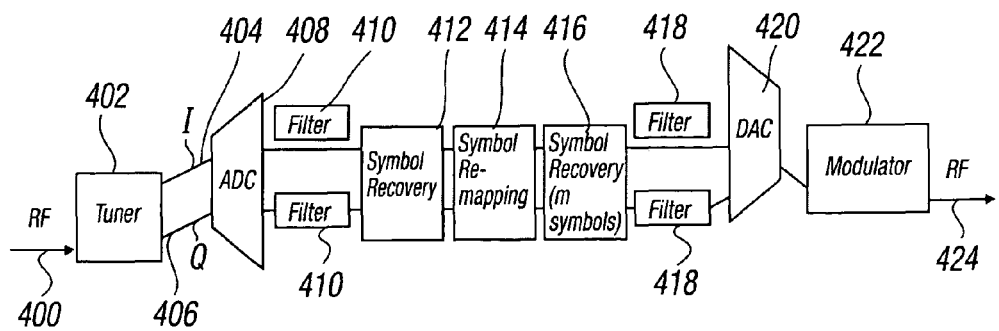
FIG. 11 illustrates an example of symbol stacking means for use with a symbol re-mapping method according to one aspect of the present invention.

Referring to FIG. 11, there is illustrated an example of symbol stacking means for achieving data compression by signal re-mapping of symbols. This is achieved by providing symbol re-mapping means.

An RF signal 400 is received by tuner 402 and the individual I-Q symbols 404, 406 are passed through an analogue to digital converter (ADC) 408, filtered by filters 410 and the symbols are recovered by symbol recovery means 412 at the symbol rate S of the coding of the received signal. The symbols are then re-mapped by symbol remapping means 414 to a more complex symbol at a reduced symbol rate before being stacked as described below using symbol stacking means 416. The sequence of output symbols is then filtered by filters 418 to prevent inter-symbol interference (e.g. root raised co-sine), passed through a digital to analogue converter (DAC) 420 and modulated by modulator 422 to an RF output 424.

The re-mapping can be either to generate a more compacted complex symbol which requires a lower C/N than a simple scaling symbol stack, or can expand a complex signal to produce white space within the complex symbol constellation. At first thought it seems counter intuitive to want to expand a complex symbol, as this will increase C/N required to carry the complex symbol. However by re-mapping to expand the constellation various improvements can be added, such as increased protection against phase noise.

The bandwidth of the RF output is typically reduced by a factor of m compared with the RF input, where m is the number of symbols within the stack. However carrier to noise (C/N) of the output channel will have to be better than that of the input channel by a factor determined by the re-mapping geometry and scale factors used in the stack.

Using re-mapping to reduce carrier to noise C/N of the output channel

The 8PSK symbol can be simply remapped to reduce the required carrier to noise ratio. By transforming the 8PSK symbol to a 7PSK symbol with a centre constellation point (7PSKC) provides operation at a C/N approximately 1dB below that required for 8PSK for the same BER. This gain in performance comes purely from the geometry of the symbol. With both 8PSK and 7PSKC symbols normalised so that the maximum vector amplitude contained within either constellation equal to unity (1) then for 8PSK the minimum distance between constellation points is 0.77 whereas the minimum distance between constellation points for 7PSKC is 0.87. This increase in separation between minimum constellation points relates directly to an improvement in C/N performance.

For normal RF transmission the 7PSKC symbol would not normally be used. This is because the centre constellation point represents no RF carrier power. This creates a large peak to mean ratio within the RF transmission, and leaves the centre symbol vulnerable to both inter-symbol interference and group delay ripple within the RF channel. This does not present a problem for the stacked symbol because each original symbol can be remapped then summed with an amplified version of the next remapped symbol as long as the last symbol in the stack is not remapped the zero amplitude vector is avoided.

Figure 22:
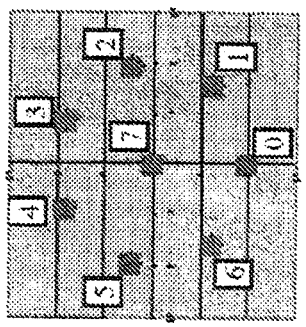
FIG. 22 illustrates graphs of two alternative mappings.
Figure 22:
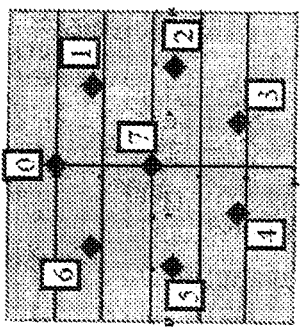
Figure 22:
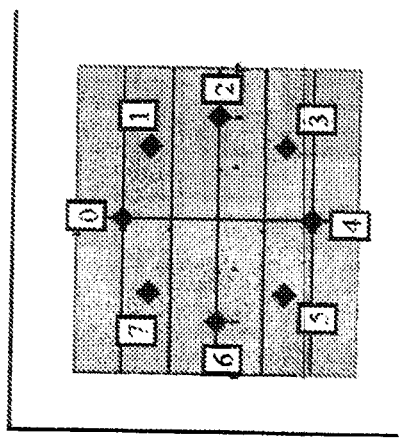

The plots shown in FIG. 22 show the original 8PSK symbol with value assignments for each constellation point in order to illustrate two alternative mappings of the 8PSK to the 7PSKC symbol. If we represent the two re-mappings as functions $M_1(\ )$, $M_2(\ )$ we can map an original sequence $\{V_1, V_2, V_3, V_4 \ldots\}$ of 8PSK symbols are stacked s symbols deep to a new sequence $\{O_1, O_2 \ldots\}$ at a $3^{rd}$ of the symbol rate using a simple scaling transform $$O_1 = M_1(V_1) + 3.3 \cdot M_2(V_2) + 12.3 \cdot V_3$$

Figure 23:
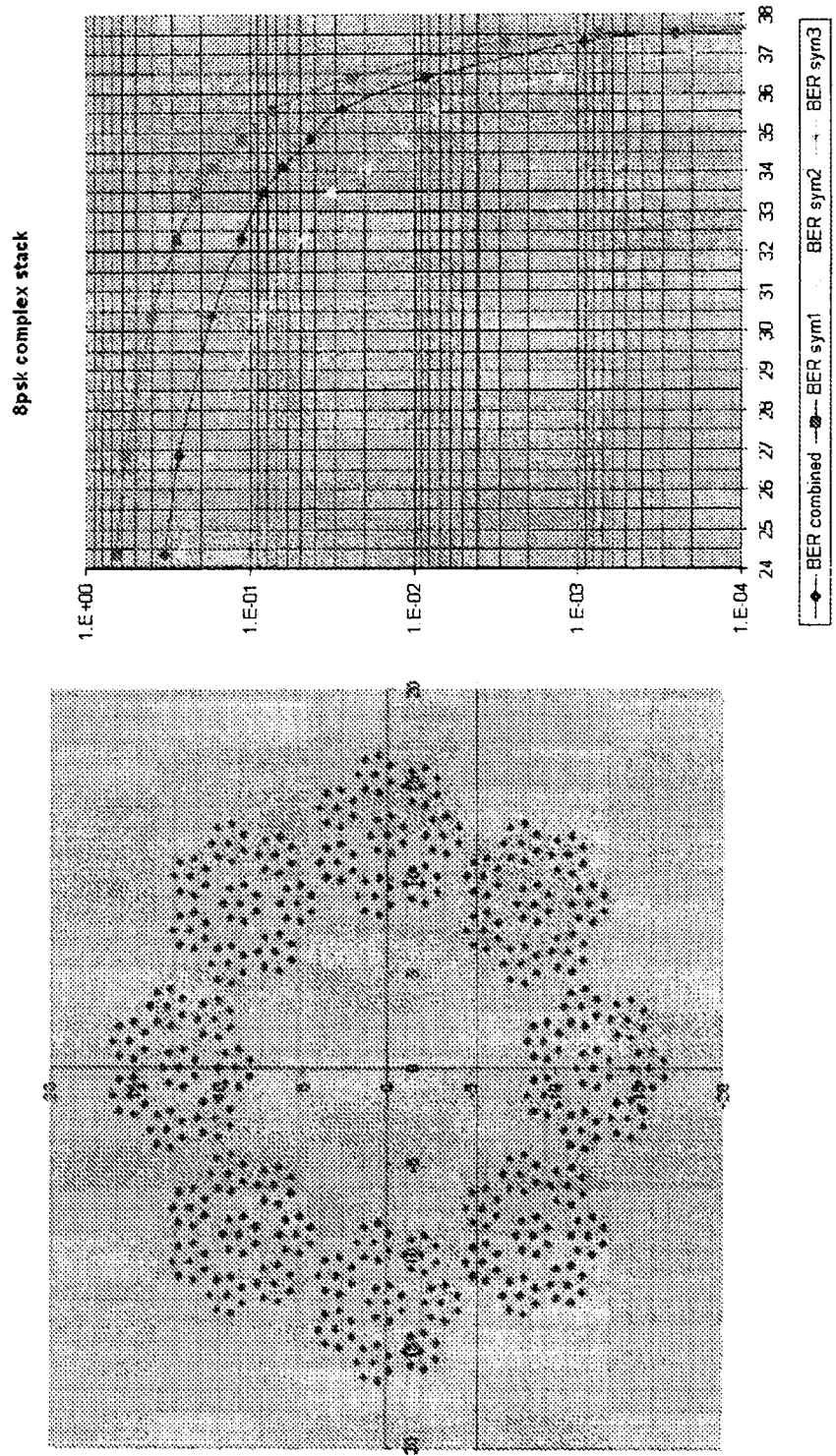
FIG. 23 illustrates a graph and chart of signal mapping.

Using the transform we have a new constellation and waterfall diagram as shown in FIG. 23.

Comparing the C/N required for a BER of 1E-4 has been improved from 39.5 dB for the simple stack to 37.6 dB for the more complex stack with symbol re-mapping. This 1.9 dB improvement in performance is significant. To gain further improvement we need to re-map the third symbol as well. This can be achieved providing that we take action to avoid zero carrier amplitude. Zero carrier amplitude can only occur when both the original symbols would result in a centre constellation point ($V_2=7$ && $V_3=7$), when this condition is true we do not re-map the first symbol but scale it instead to avoid reduced C/N. Because we have scaled the first symbol to avoid zero carrier amplitude we have to increase the scaling of the second symbol in this condition ($V_3=7$).

This leads to the full mapping equation of $$O_1 = \text{if}((V_2=7 \ \&\& \ V_3=7), 1.7.V_1, M_1(V_1)) + \text{if}((V_3=7), 4.2.M_2(V_2), 3.3.M_2(V_2)) + 11. \ M_1(V_3)$$

Figure 24:
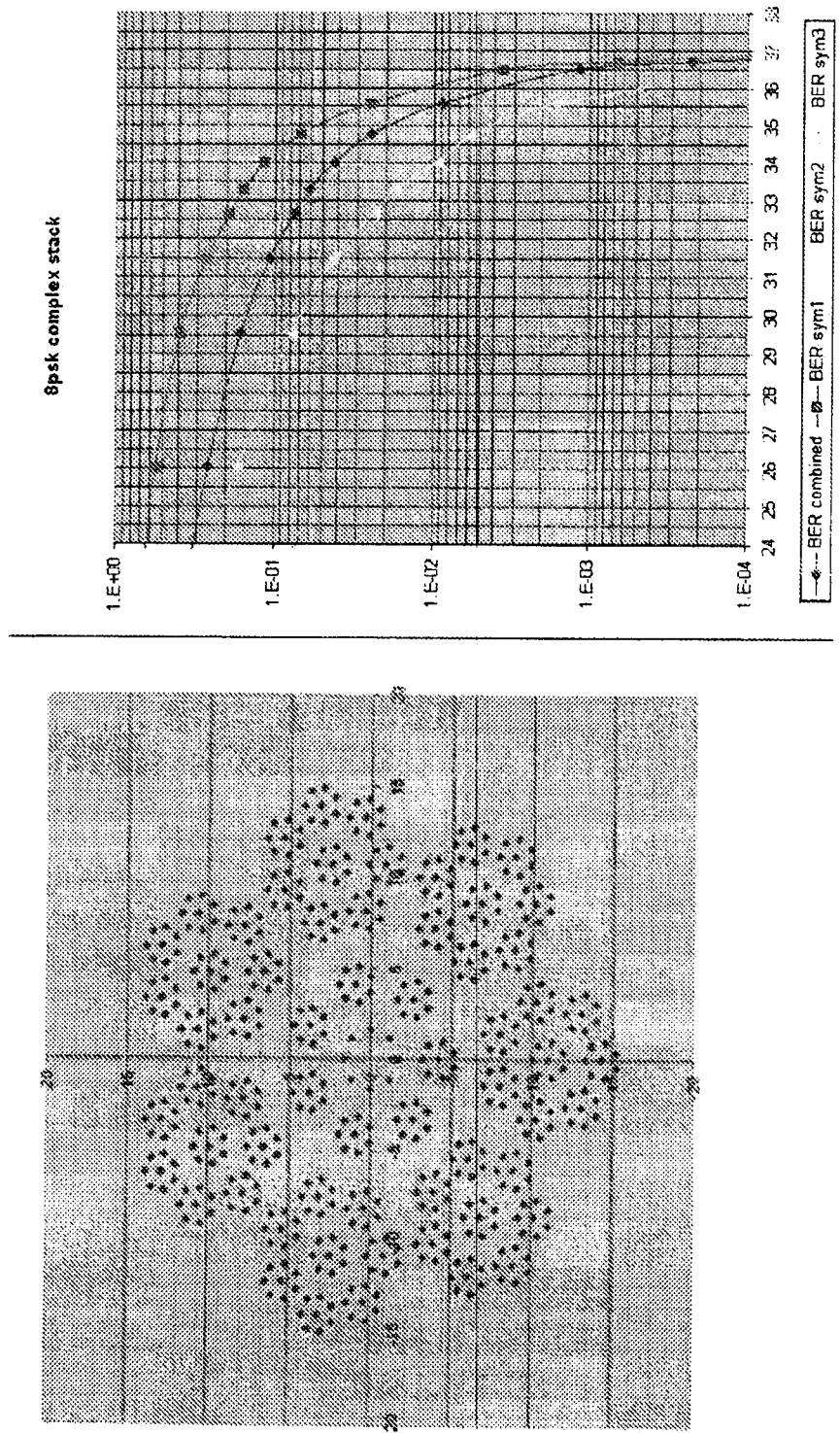
FIG. 24 illustrates a graph and chart of signal mapping.

Using the transform we have a new constellation and waterfall diagram as shown in FIG. 24.

Figure 25:
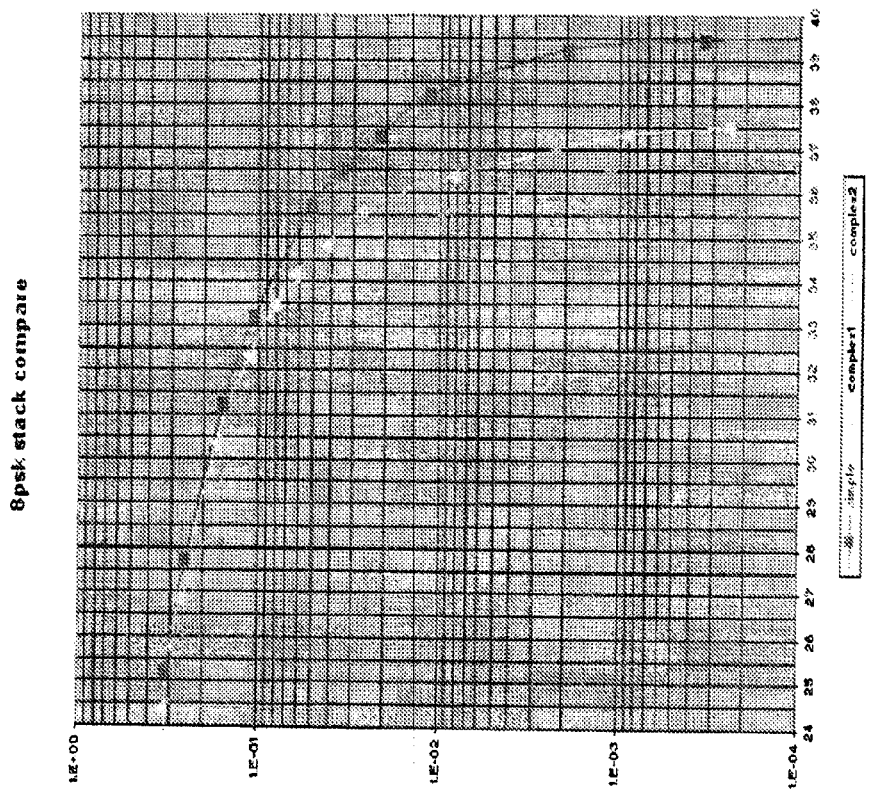
FIG. 25 illustrates a chart of signal mapping.

The waterfall diagram shown in FIG. 25 compares the two complex remapped stacked constellations with the original simple stack.

Comparing the C/N required for a BER of 1E-4 has been improved from 39.5 dB for the simple stack to 36.7 dB for the more complex stack (complex2) with symbol re-mapping. This 2.8 dB improvement in performance is significant and represents a saving in the power required to transmit the stacked symbol for a given BER performance.

Figure 26:
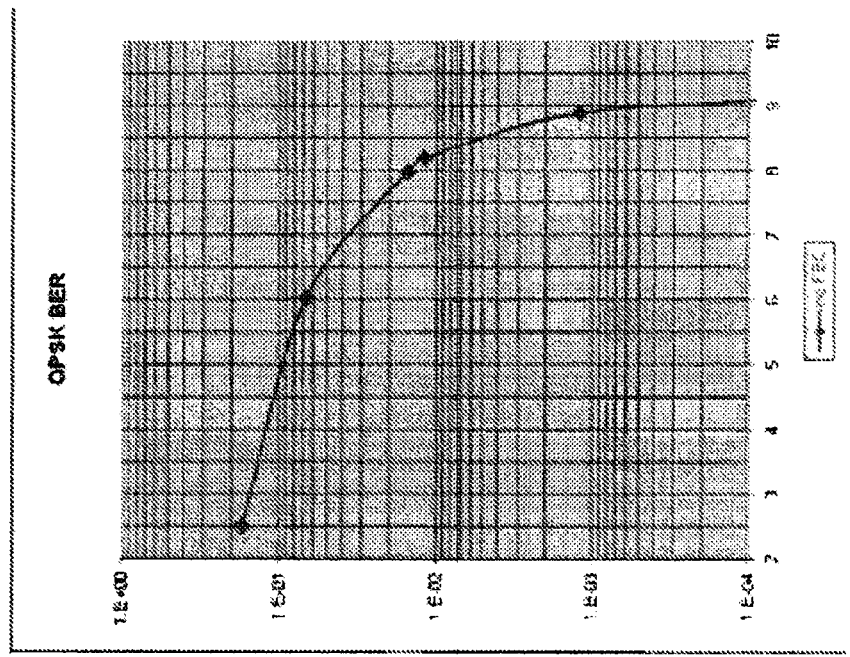
FIG. 26 illustrates a graph and chart of a QPSK modulation.
Figure 26:
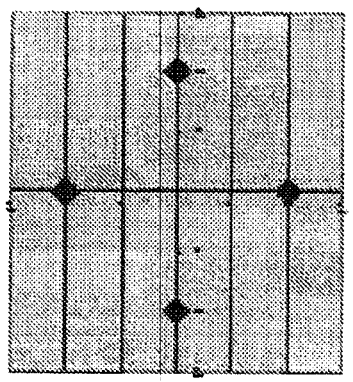

Using re-mapping to expand the stacked symbol for QPSK symbols FIG. 26 shows the IQ constellation for a QPSK symbol along with the waterfall curve of BER against C/N without FEC Re-mapping 3 consecutive symbols $V_1, V_2, V_3$ using the simple symbol stack to a new complex symbol $O_1$ using the formula $$O_1 = V_1 + 2.V_2 + 4. \ V_3$$

Figure 27:
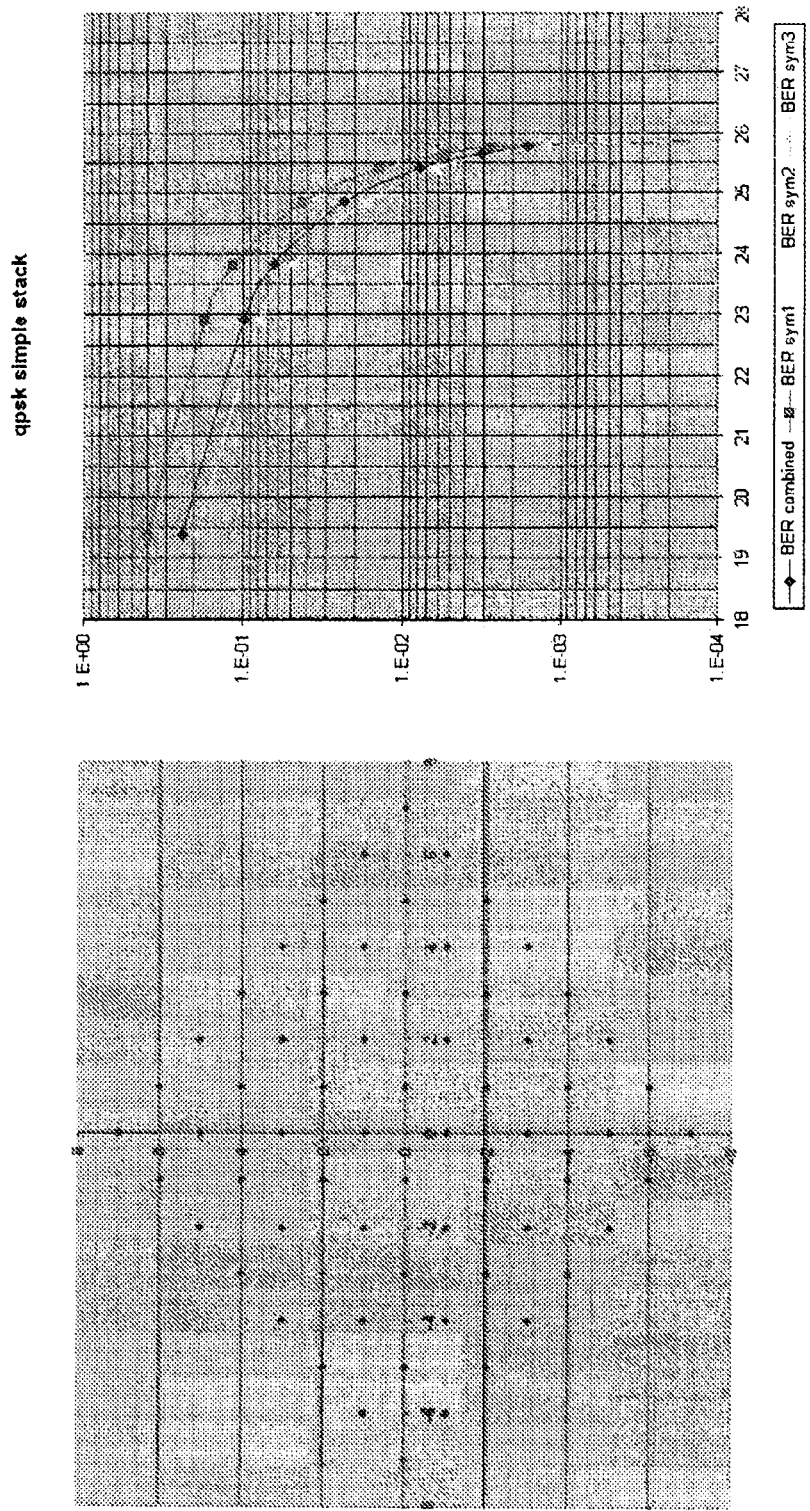
FIG. 27 illustrates a graph and chart of a signal spectrum.

We have a simple stacked constellation, eye and waterfall diagram as shown in FIG. 27.

The simple stack for QPSK symbols results in the most compact symbol space possible since all adjacent constellation points are equidistant. This provides the highest immunity in the presence of thermal noise, however this stacked symbol contains a high peak to mean ratio of 2.34. In the presence of amplifier non-linearity a high peak to mean ratio can result in inter-symbol interference that reduces BER performance.

Figure 28:
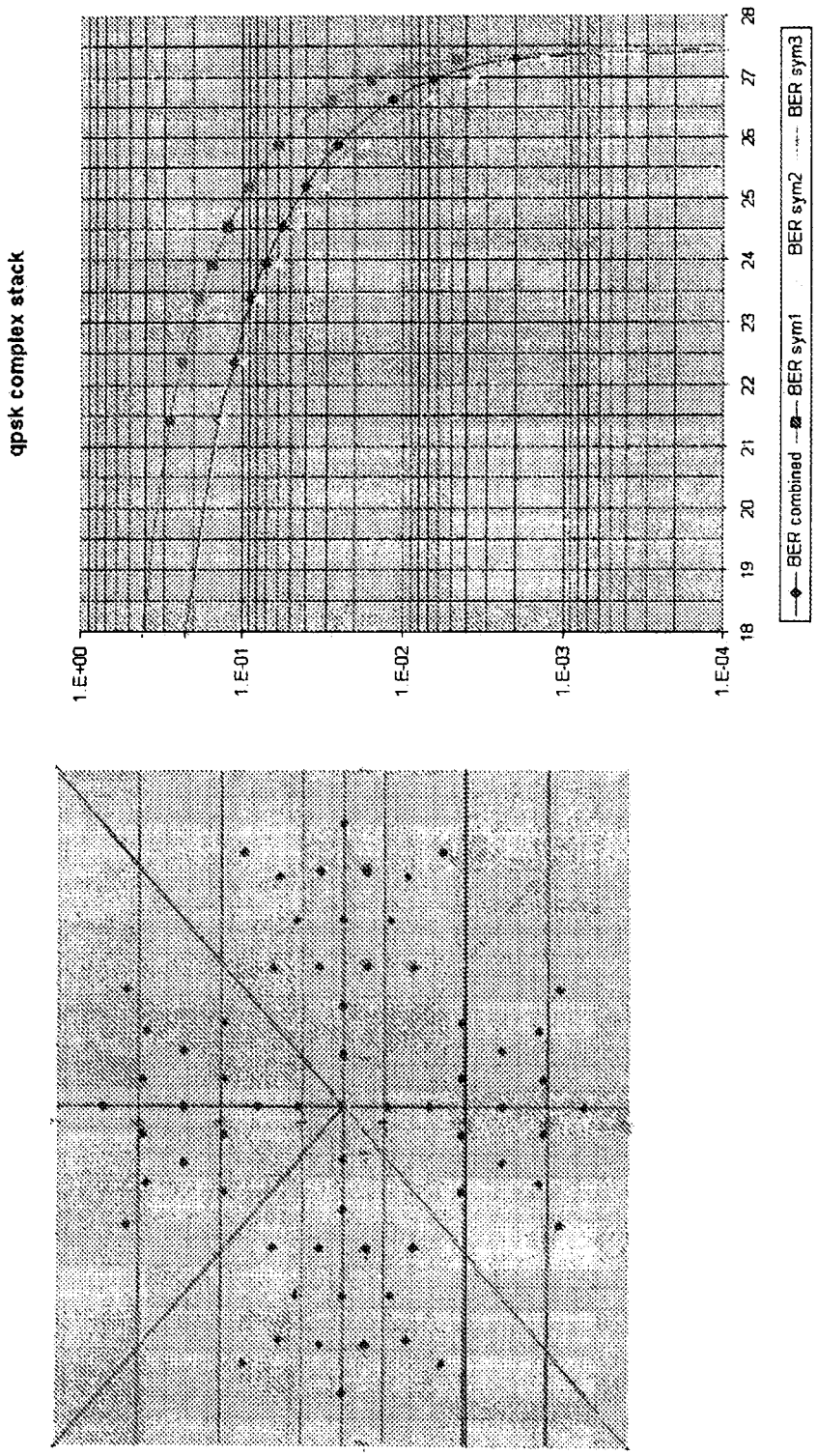
FIG. 28 illustrates a graph and chart of a signal mapping.

The re-mapping shown in FIG. 28 is just one of the possible ways of using the symbol related mapping principle described in the 8PSK case above. This re-map produces a symbol stack that is expanded, it reduce the peak to mean ratio of the symbol and increase the thermal noise immunity of one symbol in three, at the expense of the combined thermal to noise immunity for the complex stack.

The peak to mean ratio for this re-mapped stack is 1.9 and is significantly less than the 2.34 from the simple stack.

This aspect of the invention can be modified to re-map the incoming symbols so that they tessellate more efficiently when stacked and hence reduce the C/N required to receive the stacked symbol. The invention can be modified to re-map the incoming symbols so that the peak to mean ratio of the stacked symbol is reduced hence improving the performance of the stacked symbol in the presence of link non-linearity.

The invention claimed is:

1. A control unit for use in satellite distribution apparatus, said control unit comprising:
    means for allowing a plurality of received digital broadcast signals to be selected at an RF input;
    means for allowing the bandwidth of said selected signals to be compressed and rearranged for transmission onto a single cable outlet; and
    signal symbol stacking means to receive symbols associated with said selected signals from a signal demodulator;
    at least one filter, a digital to analogue converter (DAC) and a modulator through which new symbols output from the signal symbol stacking means pass to an RF output such that the RF output bandwidth is reduced by a factor of m compared with the RF input, where m is the number of symbols within the stack generated by the signal symbol stacking means;
    wherein the signal symbol stacking means rearranges the compressed signal by remapping said signal symbols; and
    wherein the new symbol is a weighted summation of "m" symbols.

2. A control unit according to claim 1 wherein for every 'n' symbol received by the signal symbol stacking means, said means generates a new symbol at 1/n of the received symbol rate, where 'n' is an integer.

3. A control unit according to claim 2 wherein n=4 for digital video broadcast satellite (DVBS) signals.

4. A control unit according to claim 2 wherein n=3 for digital video broadcast satellite 2 (DVBS2) signals.

5. A control unit according to claim 1 wherein at least part of the means for compressing said selected digital broadcast signals also includes base band shaped filtering means.

6. A control unit according to claim 1 wherein the signal symbol stacking means rearranges the compressed signal by scaling said signal symbols.

7. A control unit according to claim 6 wherein the scaling includes scaling a first symbol V1 by a factor 'C' and adding the scaled first symbol to a second symbol V2 to provide a newly scaled vector O1 =C×V1+V2.

8. A control unit according to claim 1 wherein the signal symbol stacking means rearranges the compressed signal by scaling and remapping said signal symbols.

9. A control unit according to claim 1 wherein the signal stacking means uses one or more channel cards to allow a plurality of selected digital broadcast signals to be combined and compressed to form a single output signal.

10. A control unit according to claim 1 wherein back channel communication means are provided with the control unit to allow communication between a device receiving the compressed rearranged signals and the control unit.

11. A control unit according to claim 1 wherein the control unit can operate in at least two different modes including a broadcast mode and a frequency translation module mode.

12. A control unit according to claim 10 wherein carousel data and/or media access control (MAC) messages are fed back to the control unit via the back channel communication means.

13. A control unit according to claim 1 wherein signal distribution means are provided for distributing a plurality of cable feed signal inputs from a satellite to one or more channel cards provided in the control unit.

14. A control unit according to claim 1 wherein diplexing means are provided for diplexing the signal prior to outputting the rearranged signal to a single cable outlet.

15. Satellite distribution apparatus for distributing digital broadcast signals in a pre-determined locality or building, said apparatus comprising:
    satellite receiving means for receiving broadcast signals from at least one satellite;
    communication means for transmitting the received signals to a control unit in the locality or building, said control unit allowing a plurality of received digital broadcast signals to be selected and output onto a single cable for distribution around said locality or building;
    means for allowing the bandwidth of the selected signals from an RF input to be compressed and rearranged for transmitting onto a single cable RF outlet; and
    signals symbol stacking means to receive symbols associated with said selected signals from a signal demodulator;
    at least one filter, a digital to analogue converter (DAC) and a modulator through which new symbols output from the signal symbol stacking means pass to an RF output such that the RF output bandwidth is reduced by a factor of m compared with the RF input, where m is the number of symbols within the stack generated by the signal symbol stacking means;
    wherein the signal symbol stacking means rearranges the compressed signal by remapping said signal symbols; and
    wherein the new symbol is a weighted summation of "m" symbols.

16. Apparatus according to claim 15 wherein conversion means are provided in locality or building for receiving the rearranged compressed digital signals and reconfiguring said signals back to the original configuration for processing by broadcast receiving means.

17. Apparatus according to claim 16 wherein the adaptor is powered from an LNB power supply of the broadcast receiving means.

18. Apparatus according to claim 15 wherein the conversion means are provided in the broadcast receiving means.

19. Apparatus according to claim 15 wherein the conversion means are provided in the form of an adaptor for use with broadcast receiving means.

20. A method of compressing digital broadcast signals, said method comprising:
    selecting a plurality of received digital broadcast signals at an RF input;
    compressing and rearranging the bandwidth of said selected signals for transmission onto a single cable RF outlet, and wherein at least part of the step for compressing said selected digital broadcast signals includes a signals stacking means to receive symbols associated with said selected signals from signal demodulation means, and wherein at least one filter, a digital to analogue converter (DAC) and a modulator through which new symbols output from the signal symbol stacking means pass to an RF output such that the RF output bandwidth is reduced by a factor of m compared with the RF input, where m is the number of symbols within the stack generated by the signal symbol stacking means;

wherein the signal symbol stacking means rearranges the compressed signal by remapping said signal symbols; and wherein the new symbol is a weighted summation of "m" symbols.

21. A method according to claim 20 wherein the method of decompressing the digital broadcast signals uses signal symbol destacking means in a reverse process to the signal symbol stacking means.

* * * * *